United States Patent [19]
Goto

[11] Patent Number: 5,920,660
[45] Date of Patent: Jul. 6, 1999

[54] TOMOGRAM INTERPOLATION METHOD FOR EXECUTING INTERPOLATION CALCULATION BY USING PIXEL VALUES ON PROJECTION LINE

[75] Inventor: Yoshihiro Goto, Tokyo, Japan

[73] Assignee: Hitachi Medical Corporation, Tokyo, Japan

[21] Appl. No.: 08/611,766

[22] Filed: Mar. 8, 1996

[30] Foreign Application Priority Data

Apr. 5, 1995 [JP] Japan ................................ 7-080547

[51] Int. Cl.[6] .................................................. G06K 9/32

[52] U.S. Cl. ........................ 382/300; 382/291; 382/293

[58] Field of Search ..................................... 382/300, 291, 382/293; 128/660.65; 364/413.19

[56] References Cited

U.S. PATENT DOCUMENTS 5,329,929  7/1994  Sato et al. ......................... 128/660.65

*Primary Examiner*—Jose L. Couso
*Assistant Examiner*—Anh Hong Do
*Attorney, Agent, or Firm*—Antonelli, Terry, Stout & Kraus, LLP

[57] ABSTRACT

In an interpolation method which determines interpolation points on a projection line not crossing vertically a plurality of tomograms by interpolation, an interpolation method of tomograms which determines the pixel values of at least two points D1 and D2 on the projection line by interpolation from the pixel values of neighboring points on the tomograms, and determines the pixel value of an interpolation point between the points D1 and D2 by utilizing at least the pixel values of the points D1 and D2 and distances between the points D1 and D2 and the interpolation point.

32 Claims, 18 Drawing Sheets

TOMOGRAM INTERPOLATION METHOD FOR EXECUTING INTERPOLATION CALCULATION BY USING PIXEL VALUES ON PROJECTION LINE

BACKGROUND OF THE INVENTION

When a three-dimensional image constituted by piling up tomograms obtained by an X-ray CT apparatus, an MRI apparatus, etc; is projected on a projection plane, this invention relates to an interpolation method which obtains other pixel values on the same projection line by interpolation calculation by using a plurality of pixel values on the projection line.

The three-dimensional image obtained by piling up a plurality of tomograms by utilizing a computer has drawn an increasing attention as the image for observing and diagnosing an outer structure of an object and an internal cubic structure of the object. Here, the term "three-dimensional image" is not directed to display three-dimensionally the images but intends to mean that two-dimensional tomograms are piled up into a three-dimensional shape and that when the images so piled up are displayed on a two-dimensional CRT, shading is effected for example, in such a fashion that those pixels which are remote from a viewpoint are displayed darker and those which are close to the viewpoint are displayed brighter and when they overlap with one another, pixels in the foreground are displayed preferentially. Therefore, though the term should be correctly called "pseudo-three-dimensional image", it is generally called the "three-dimensional image".

The tomograms that constitute the three-dimensional image are the images obtained by an X-ray CT apparatus or an MRI (which are called the "original images"), for example. If the pitch (distance) between the adjacent tomograms is great, the image is not easy to observe. Therefore, a method of determining the pixels between the adjacent tomograms by interpolation has been proposed. An example described in "MEDICAL IMAGING TECHNOLOGY" by Yasuo Sudo et al, August 1988, page 275, is shown in FIG. 1 of the accompanying drawings.

FIG. 1 shown the example where mutually parallel two original images (CT images) 1 and 2 exist adjacent to each other, and are projected from a viewpoint E to a projection plane P. The viewpoint E is an arbitrary point, and the position of the projection plane P, too, exists at an arbitrary position. The positions of the viewpoint E and the projection plane P are determined in accordance with the object of projection and the object of display.

A variety of methods exist as the projection method from the viewpoint E to the projection plane P. Therefore, various known methods may be employed such as the one that grasps the viewpoint E as a plane and effects parallel projection by parallel projection lines from this plane to the projection plane P, or another which grasps the viewpoint E as a point and effects central projection by assuming central projection lines expanding radially from this point towards the projection plane.

Referring to FIG. 1, projection from the viewpoint E to a projected point p on the projection plane P will be described. A straight line L from the viewpoint E to the projected point p is the projection line, and each pixel on this projection line L is the pixel that must be projected to the projected point p. Here, the projection line is a line that does not vertically cross two mutually parallel original images 1 and 2. In other words, the projection line L is assumed to extend obliquely with respect to the original images 1 and 2. Symbol $Q_1$ represents the point of intersection of the projection line L with the CT image 1 on the projection line L and $Q_2$ represents the point of intersection with the CT image 2. The pixel value of the point $Q_1$ corresponds to the pixel value of the CT image 1 at the corresponding position and the pixel value of the point $Q_2$ corresponds to that of the CT image 2 at the corresponding position. When the projection line L between these points $Q_1$ and $Q_2$ is divided by N (N: integer), the pixel value of each point on this projection line L must be determined by interpolation.

To effect interpolation, the coordinates of each point on the projection line L connecting the point $Q_1$ to the point $Q_2$ must be stipulated. It will be hereby assumed that the position $(x_1, y_1, z_1)$ of an interpolation point A (new tomogram point) as an arbitrary point is stipulated in the x-, y- and z-coordinates system. Here, symbols x, y and z represent a spatial coordinates system for stipulating the coordinates of each point under the state where the CT images 1, 2, etc., are piled up, y represents a coordinates axis orthogonally crossing the CT images 1 and 2 that are disposed parallel to each other, and x and z represent the coordinates axes orthogonally crossing y. The pile-up position (which is also referred to as the "slice position") of each CT image can be expressed by y, and the position of the pixel at each point of each CT image can be expressed by x and z. It will be assumed that the y position of the CT image 1 is $Y_{01}$ and the y position of the CT image 2 is $Y_{02}$.

Now, a straight line m parallel to the y axis and passing through a point A is given. The points of intersection $a_5$ and $b_5$ of this line m with the CT images 1 and 2 are $a_5(x_1, Y_{01}, Z_1)$ and $b_5(x_1, Y_{02}, Z_1)$, respectively. The distance between the point of intersection $a_5$ and the interpolation point A is $(y_{01}-y_1)$ and the distance between the interpolation point A and the point of intersection $b_5$ is $(Y_1-Y_{02})$. Assuming that the pixel values at the points $a_5$ and $b_5$ are $I_{01}$ and $I_{02}$, respectively, the pixel value $I_a$ at the interpolation point A can be obtained from them in accordance with the following linear interpolation formula:

$$I_a = \frac{I_{01}(y_1 - y_{02}) + I_{02}(y_{01} - y_1)}{y_{01} - y_{02}} \tag{1}$$

On the other hand, the pixel positions $a_5$ and $b_5$ of the CT images 1 and 2 do not practically exist in many cases because the CT pixel positions of the CT images 1 and 2 are coarser than the projection resolution. In FIG. 1, the pixel positions of the CT images 1 and 2 that are practically adjacent to one another are coarse such as $a_1, a_2, a_3, a_4, \ldots$, $b_1, b_2, b_3, b_4$, etc. Therefore, the pixel values of the pixel positions $a_5$ and $b_5$, too, are determined by the practical neighboring pixel values by interpolation. To obtain the pixel values $I_{01}$ and $I_{02}$ of the pixel positions $a_5$ and $b_5$, for instance, there is a method which calculates the pixel values by the weighted mean of the eight neighboring points $a_1, a_2, a_3, a_4, b_1, b_2, b_3$ and $b_4$ or another which calculates them by a linear interpolation method from the neighboring two points.

The explanation given above deals with the interpolation point A. To determine the pixel value $I_b$ of another interpolation point B $(x_1', y_1', z_1')$, the points of intersection $a_5'$ and $b_5'$ with the y-axis parallel line m' are similarly obtained, the pixel values $I_{01}'$ and $I_{02}'$ of the points of intersection $a_5'$ and $b_5'$ are determined by interpolation, and linear interpolation such as equation (1) is effected between the distances $(y_{01}-y_1')$ and $(y_1'-y_{02})$ from the pixel values $I_{01}'$ and $I_{02}'$ obtained by interpolation described above and the points of intersection $a_5'$ and $b_5'$, so as to obtain the pixel value $I_{01}'$ and $I_{02}'$ obtained by interpolation described above and the points of intersection $a_5'$ and $b_5'$, so as to obtain the pixel value $I_b$ of the interpolation point B.

The calculation described above is made for each basic pitch between the points $Q_1$ and $Q_2$ of the projection line L and the interpolation pixel value for each basic pitch is determined. Because the projection line is variously determined by its projection method, such a process is effected for all the projection lines for the CT images 1 and 2. Further, a similar process is effected to other CT images adjacent to the CT images 1 and 2 to obtain the pixel values. When the pixel values so obtained are displayed, the display content becomes extremely unclear if they are as such displayed. Therefore, a display method (called a "voxel method" or a "depth method") which displays the pixel values away from the visual point darker (to a small value) and the pixel values closer to the visual point brighter is employed. This method is referred to as a "shading process". Furthermore, image processing (plane shading processing) is carried out by removing the depth side and displaying only the pixel values on the most foreground side.

In FIG. 1, if the interpolation point A between the points $Q_1$ and $Q_2$ is the pixel position not having the pixel value of the CT image, the interpolation pixel values $I_{01}$ and $I_{02}$ at the interpolation points $a_5$ and $b_5$ are determined, and the pixel value $I_a$ of the interpolation point A is determined from the interpolation pixels $I_{01}$ and $I_{02}$ by interpolation. A similar process is necessary for the interpolation point B. In other words, an interpolation process must be executed twice for each interpolation point. More than two interpolation points exist in most cases between the points $Q_1$ and $Q_2$, and the interpolation process must be carried out twice each time. Further, the number of projection lines is great, too, and a similar process is executed between the adjacent CT images. As a result, the number of times the interpolation process is performed becomes enormous as a whole.

FIG. 2 shows an example of non-linear interpolation according to the prior art.

Transverse lines represent the original tomograms comprising actual measurement data and longitudinal lines represent the interpolation image obtained by interpolation. Pixels are assumed to exist at the points of intersection between the transverse lines and the longitudinal lines. To determine the pixel value of the interpolation point M' on the projection line L, a straight line m1 passing through the point M' and perpendicularly crossing the original tomograms is considered, and the points of intersection A0, A1, A2 and A3 between the line m1 and the original tomograms are determined by interpolation. The pixel value of the point M' is then determined by non-linear interpolation by using the pixel values of the points A0 to A3.

When the pixel value of another interpolation point M" is obtained, a straight line m2 passing through the point M" and perpendicularly crossing the original tomograms is considered in the same way as in the case of M', and the points of intersection B0, B1, B2 and B3 are determined. The pixel value of the point M" is determined by non-linear interpolation by using the pixel values of these points B0 to B3.

In other words, the pixel values of four new points of intersection must be obtained by interpolation for each interpolation point, and a long time is therefore necessary for the computation.

SUMMARY OF THE INVENTION

It is an object of the present invention to provide a pixel interpolation method, and an apparatus therefor, which can quickly obtain interpolation pixel values by reducing the number of times an interpolation process is performed.

In an interpolation method which determines interpolation points (new tomogram points) on a projection line between adjacent original tomograms, which does not perpendicularly cross each original tomogram, by interpolation calculation, the interpolation method according to the present invention involves the steps of determining the pixel values $I_{11}$ and $I_{12}$ of the points of intersection $Q_1$ and $Q_2$ of the projection line with the adjacent original tomograms, respectively, and determining the pixel value $I_i$ (i=1, 2, ...) of each interpolation point A, B, ... along the projection line between the points of intersection $Q_1$ and $Q_2$ by interpolation by using at least the pixel values $I_{11}$ and $I_{12}$ and at least the distances $r_1$ and $r_2$ between the interpolation points and the points of intersection $Q_1$ and $Q_2$.

The interpolation method of the present invention comprises also the steps of normalizing the distance between the adjacent original tomograms and the basic pitch distance $P_0$ of the interpolation point obtained from this normalized distance, obtaining the positions of the interpolation points A, B, ... along the projection line between the points of intersection $Q_1$ and $Q_2$ by updating the distance for each basic pitch distance, and determining the pixel values $I_i$ of each interpolation point A, B, ... by interpolation by using at least the pixel values $I_{11}$ and $I_{12}$ of the points of intersection $Q_1$ and $Q_2$ and the normalized distances $p_i$ and $1-p_i$ between the interpolation point and the points of intersection $Q_1$ and $Q_2$.

In the present invention, the pixel values $I_{11}$ and $I_{12}$ of the points of intersection $Q_1$ and $Q_2$ at which the projection line crosses the adjacent original tomograms are determined by interpolation from the pixel values of original tomograms around the points of intersection, and these pixel values $I_{11}$ and $I_{12}$ are used for the interpolation calculation described above.

In the present invention, further, two points D1 and D2 that exist between adjacent original tomograms and exist also on the projection line are determined by interpolation from the pixel values of the original tomograms, and the pixel value of the interpolation point $M_i$ (i=1, 2, ...) on the projection line between these two points D1 and D2 is determined by the interpolation calculation by using at least the pixel values of the points D1 and D2 and the distances between the interpolation point $M_i$ and these points D1 and D2.

In the present invention, further, the distance $d_i$ between the interpolation point and a viewpoint E as the starting point of the projection line is calculated by interpolation by using the distances $d_1$ and $d_2$ between the points of intersection $Q_1$ and $Q_2$ and the viewpoint E and the normalized distances $p_i$ and $1-p_i$ between the interpolation point and the points of intersection $Q_1$ and $Q_2$, whether or not the pixel value $I_i$ of the interpolation point satisfies a threshold condition for extracting an organ is checked, this pixel value $I_i$ is then converted to a value image(X, Y) inversely proportional to the distance $d_i$ from the viewpoint E when the condition is satisfied, and this value image (X, Y) is used as the pixel value for display for the projected point p.

The interpolation calculation in the present invention includes linear interpolation and non-linear interpolation. Linear interpolation uses two points ($Q_1$, $Q_2$) or (D1, D2) while non-linear interpolation uses one or a plurality of points on the projection line in addition to the two points described above.

According to the present invention, the pixel value of the interpolation point on one projection line can be determined by the interpolation calculation by using at least the pixel values $I_{11}$ and $I_{12}$ of the points of intersection $Q_1$ and $Q_2$ at which the original tomograms and the projection line cross and the distances $r_1$ and $r_2$ between the interpolation point and the points of intersection $Q_1$ and $Q_2$. Once the projection line and the two original tomograms are determined, the pixel values $I_{11}$ and $I_{12}$ of the points of intersection $Q_1$ and $Q_2$ can be primarily determined, and the pixel value of the interpolation point can be simply obtained whenever the distances $r_1$ and $r_2$ between the points of intersection $Q_1$ and $Q_2$ and the interpolation point are determined each time.

In other words, once the interpolation calculation for determining the pixel values $I_{11}$ and $I_{12}$ of the point of intersection $Q_1$ and $Q_2$ is conducted by using the pixel value on the original tomogram, the pixel value on the new tomogram can be calculated by using the calculation result. Therefore, the number of times the interpolation calculation is performed on the original tomogram can be reduced and the calculation time can be shortened.

When the pixel values of the two points on the projection line are determined by interpolation, the pixel values of other points between the two points can be determined by using the pixel values of these two points. Therefore, the calculation time can be shortened.

DESCRIPTION OF THE PREFERRED EMBODIMENTS

Figure 3:
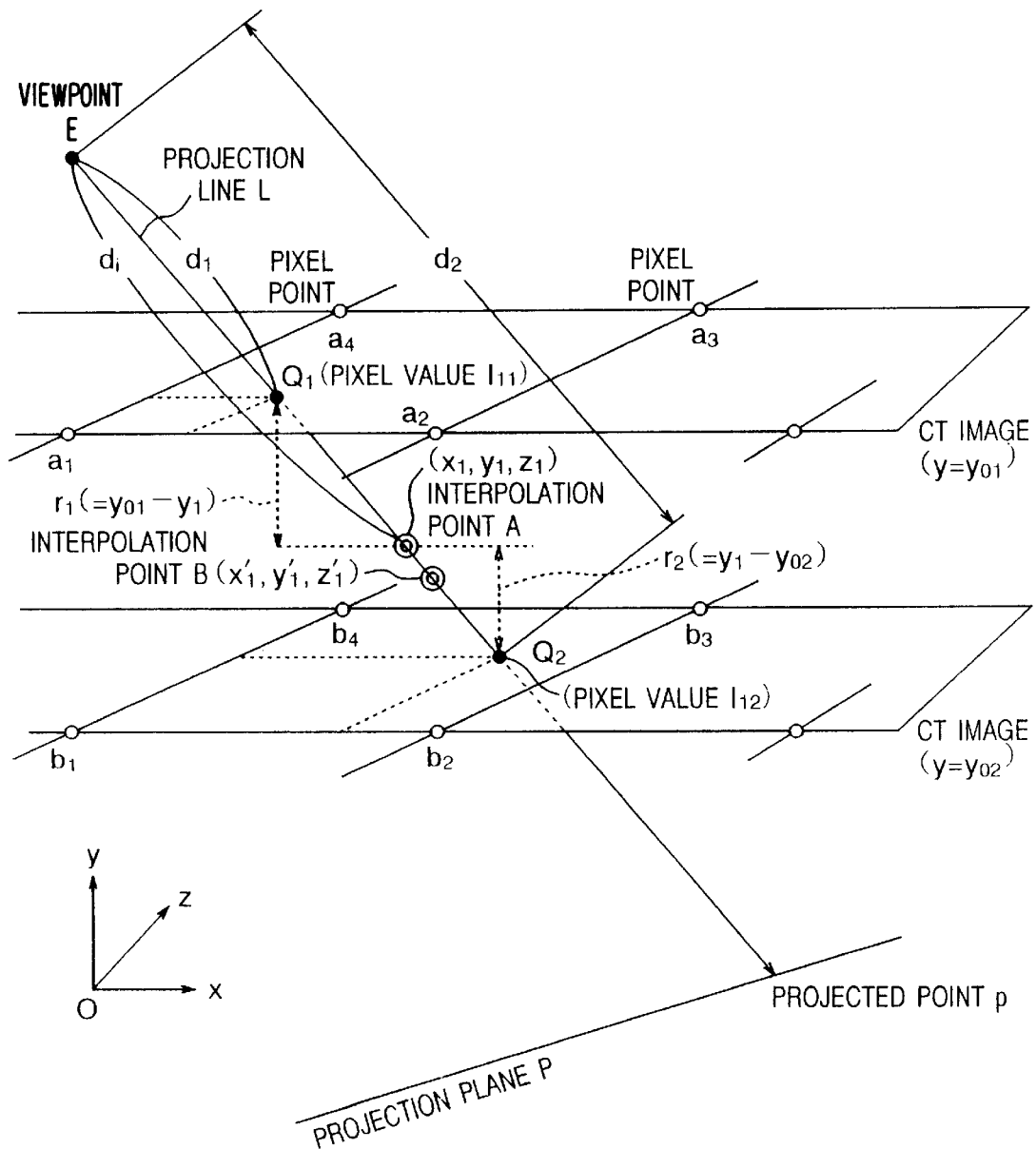
FIG. 3 is a diagram useful for explaining an embodiment of a tomogram linear interpolation method according to the present invention.

FIG. 3 is a diagram useful for explaining the interpolation method according to the present invention. This drawing is an explanatory view when pixel values of pixel positions A, B, ... on a projection line L between points of intersections $Q_1$ and $Q_2$ are used in a three-dimensional image construction in the same way as in FIG. 1 described already.

The basic concept of the interpolation method according to the present invention will be described. When two adjacent CT images 1 and 2 are given and a projection line L is set from an oblique direction to these CT images 1 and 2, the position of the point of intersection $Q_1$ between the projection line L and the CT image 1 is determined, and the position of the point of intersection $Q_2$ between the projection line L and the CT image 2 is likewise determined. When the points of intersection $Q_1$ and $Q_2$ are determined in this way, the pixel values $I_{11}$ and $I_{12}$ of these points of intersection $Q_1$ and $Q_2$ can be determined by interpolation using pixel values ($a_1$, $a_2$, $a_3$, $a_4$; $b_1$, $b_2$, $b_3$, $b_4$) around these points of intersection $Q_1$ and $Q_2$. Interpolation is effected by a non-linear interpolation method or a linear interpolation method.

The pixel value $I_i$ of the interpolation point on the projection line L between the points of intersection $Q_1$ and $Q_2$ (that is, a new tomographic point) is determined by interpolation of the pixel values $I_{11}$ and $I_{12}$ of the points of intersection $Q_1$ and $Q_2$ and distances $r_1$ and $r_2$ from the points of intersection $Q_1$ and $Q_2$ to the interpolation point in a y-axis direction in accordance with the following equation:

$$I_i = \frac{r_2 I_{11} + r_1 I_{12}}{r_1 + r_2} \quad (2)$$

In equation (2), the values $I_{11}$ and $I_{12}$ are those values which can be determined by interpolation when the projection line L and the points of intersection $Q_1$ and $Q_2$ are determined, and are fixed values for the calculation of the pixel values of all the interpolation points between $Q_1$ and $Q_2$. The distances $r_1$ and $r_2$ are variable values for all the points between $Q_1$ and $Q_2$. In other words, once the pixel values $I_{11}$ and $I_{12}$ of the points of intersection $Q_1$ and $Q_2$ are determined in this embodiment, all the interpolation points between $Q_1$ and $Q_2$ can be calculated by equation (2) whenever the distances $r_1$ and $r_2$ are calculated.

Figure 1:
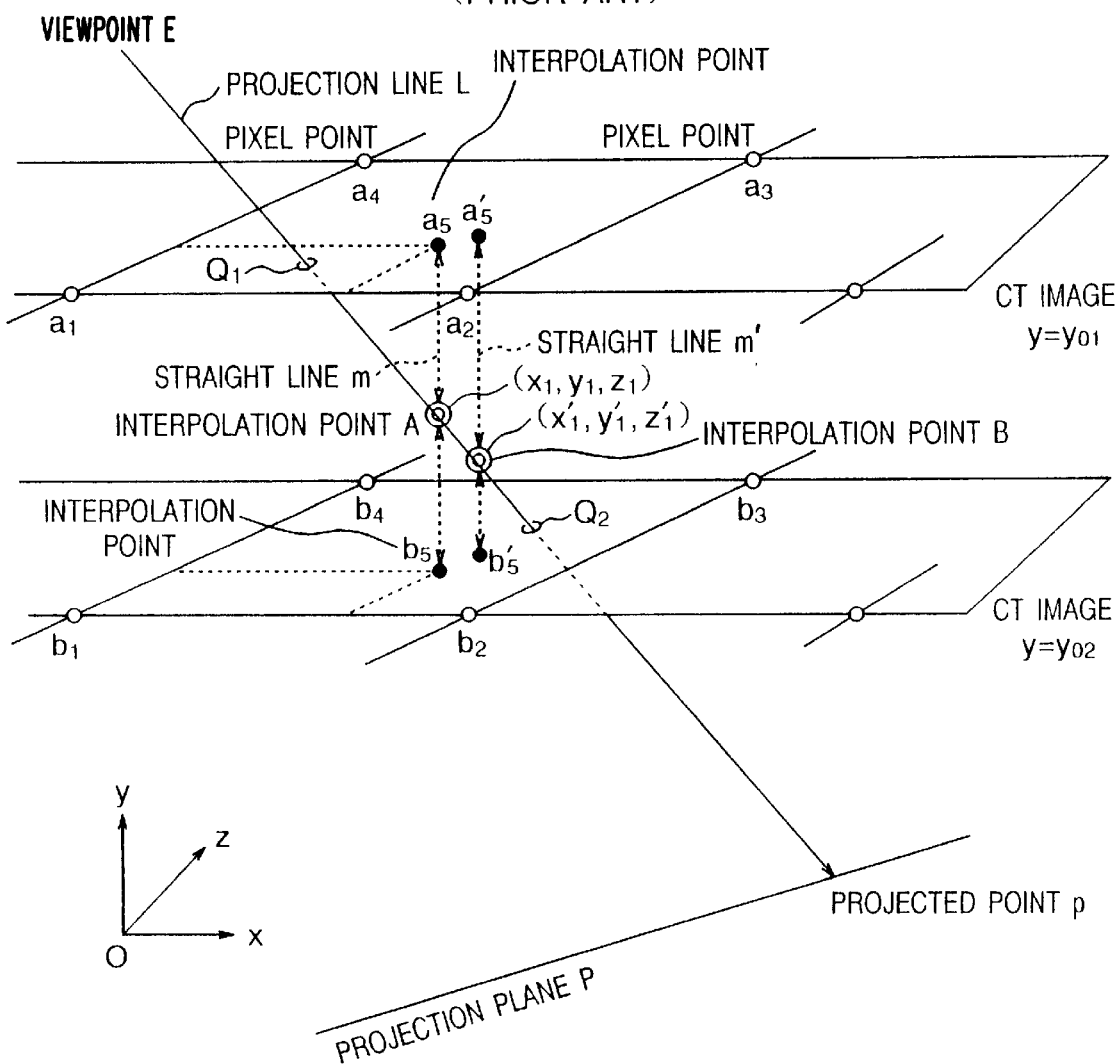
FIG. 1 is a diagram showing a tomogram linear interpolation method according to the prior art.

When this embodiment is compared with the prior art example shown in FIG. 1, it is necessary in FIG. 1 to determine two pixel values $a_5$, $b_5$ and $a_5'$, $b_5'$ for A and B and to calculate the pixel values of A and B by equation (1), respectively, in order to obtain the pixel values of the two pixel positions A and B. In contrast, in this embodiment, once the pixel values of the points of intersection $Q_1$ and $Q_2$ are determined, the pixel values of A and B can be calculated by equation (2) by determining the distances $r_1$ and $r_2$ in the y-axis direction at each time.

Next, a concrete process example of the present invention will be explained.

Figure 4:
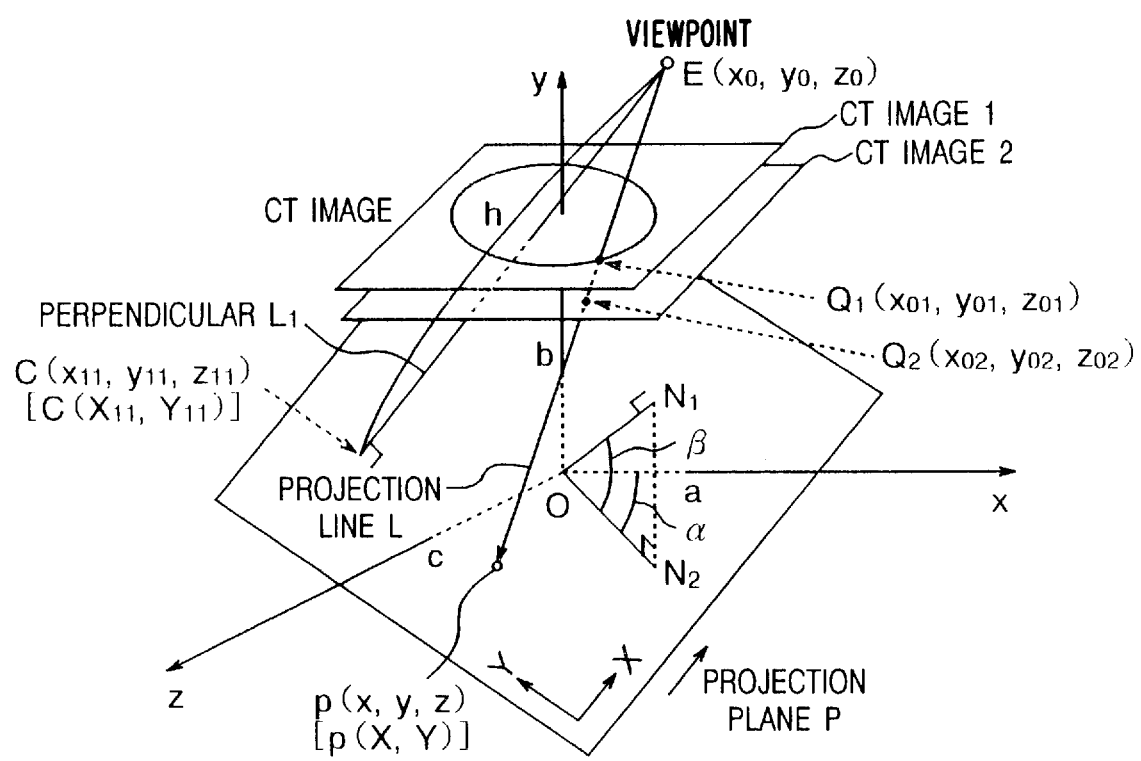
FIG. 4 is a diagram showing a viewpoint and a projection plane as a whole.

FIG. 4 is a diagram showing the coordinates system necessary for the process of this embodiment, the definition of the viewpoint E and the projection plane P, and their correlationship. Symbols x, y and z represent a spatial coordinates system of a piled-up three-dimensional image. The y-axis is a coordinates axis perpendicular to the pile-up CT image, and the x- and z-axes are planar coordinates axes orthogonal to the y-axis. The projection plane P and the viewpoint E are determined in accordance with the object of diagnosis and with the object of projection. The viewpoint E may be one of the viewpoints on the plane by the parallel projection method or the viewpoint of the central projection method.

The projection plane P is defined by three parameters, that is, two angles $\alpha$ and $\beta$ and the distance h. A perpendicular is drawn from the origin O in the x-y-z coordinates system to the projection plane P, and its point of intersection is $N_1$. This point of intersection $N_1$ is vertically projected on the x-z plane and its projected point is $N_2$. The parameter $\alpha$ represents the angle between a straight line connecting the origin O to the point of intersection $N_2$ and the x-axis, while the parameter $\beta$ represents the angle between a straight line connecting the origin O to the point of intersection $N_2$ and a straight line connecting the origin O to the point of intersection $N_1$. The distance h is the distance between the viewpoint of the perpendicular $L_1$ from the viewpoint E to the projection plane P and the vertical point of intersection C, and this parameter h defines the relationship between the viewpoint E and the projection plane P.

The coordinates system of the projection plane P itself is defined by X and Y. The position of the viewpoint E is $E(x_0, y_0, z_0)$ and the point of intersection p between the projection line L from this viewpoint E and the projection plane P (that is, the projected point) is $p(x, y, z)$. This $p(x, y, z)$ is expressed as $p(X, Y)$ in the X-Y coordinates system. The point vertically crossing the projection plane P from the viewpoint E is $C(x_{11}, y_{11}, z_{11})$, which is expressed as $C(X_{11}, Y_{11})$ on the X-Y plane.

It will be further assumed that the pixels exist at four points $a_1, a_2, a_3$ and $a_4$ around the point of intersection $Q_1$ in the CT image 1 and the pixels also exist at four points $b_1, b_2, b_3$ and $b_4$ around the point of intersection of the point of intersection $Q_2$ in the CT image 2.

Figure 5:
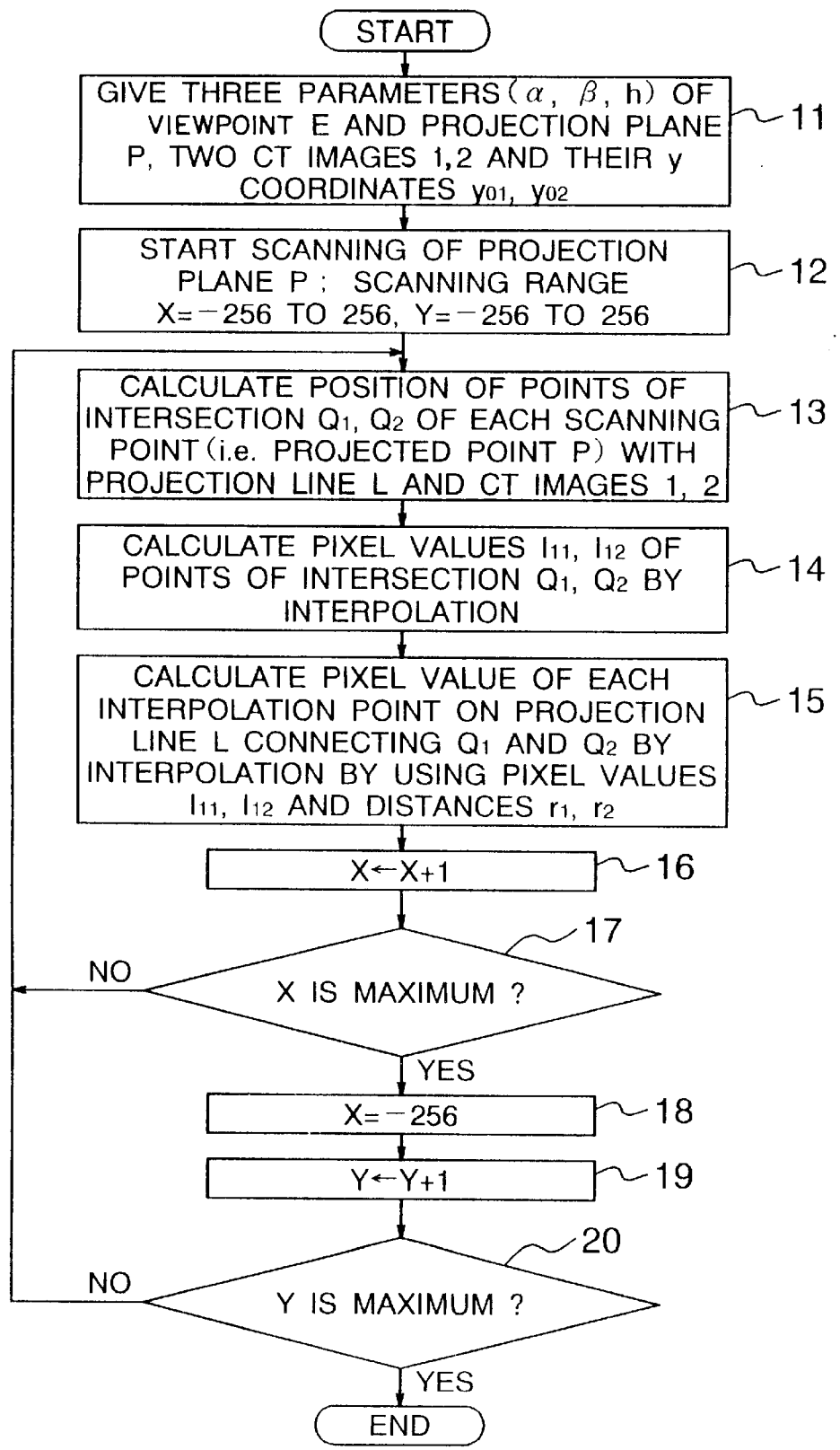
FIG. 5 is a flowchart of the embodiment shown in FIG. 5.

FIG. 5 shows a process flowchart under the coordinates systems and the definition of the positions given above. At the first step 11, the position $(x_0, y_0, z_0)$ of the viewpoint E, the three parameters $(\alpha, \beta, h)$ of the projection plane P, two adjacent CT images 1 and 2 and the y coordinates values $y_{01}$ and $Y_{02}$ are set and inputted. The CT images 1 and 2 are stored in a memory, and image designation is executed by designating their pixel number.

Scanning of the projection plane P is started at the step 12. In the central projection method, the coordinates corresponding to the combination of x and y are sequentially selected, and in the parallel projection method, on the other hand, a large number of parallel projection lines are sequentially selected. A luster scanning method is a typical example of the scanning method.

At the next step 13, the positions of the points of intersection $Q_1$ and $Q_2$ at which the projection line L and the CT images 1 and 2 cross are calculated for each scanning point (that is, the projected point p). This calculation method will be explained elsewhere.

Next, the image values $I_{11}$ and $I_{12}$ of the points of intersection $Q_1$ and $Q_2$ are determined by interpolation at the step 14. This interpolation is executed by linear interpolation using the pixel values of the four points $a_1, a_2, a_3$ and $a_4$ or non-linear interpolation using the pixel values of other surrounding points.

At the next step 15, the pixel value $I_i$ $(i=1, 2, \ldots, n)$ of each interpolation point A, B . . . on the projection line L connecting the points of intersection $Q_1$ and $Q_2$ is determined by interpolation. Here, this interpolation uses the values $I_{11}$ and $I_{12}$ and the distances $r_1$ and $r_2$ obtained at the step 14 for all the interpola-tion points of A, B . . . , and so forth. The values $I_{11}$ and $I_{12}$ are fixed values for all the interpolation points. The values $r_1$ and $r_2$ are the distance between $Q_1$ and $Q_2$ and each point A, B, . . . , in the y-axis direction and are different for each of the interpolation points A, B, . . . . Equation (3) represents an example of the interpolation formula:

$$I_i = \frac{I_{11} r_2 + I_{12} r_1}{r_1 + r_2} \tag{3}$$

A scanning range in the x direction is incremented at the step 16, and whether or not the x value reaches the maximum value within the scanning range is checked. If the result proves NO, the flow returns to the step 13 and if it proves YES, x=−256 is set at the step 18.

A scanning range in the y direction is incremented at the step 19 and whether or not the Y value reaches the maximum value within the scanning range is checked at the step 20. If the result proves NO, the flow returns to the step 13 and if it proves YES, the process is completed.

Figure 6:
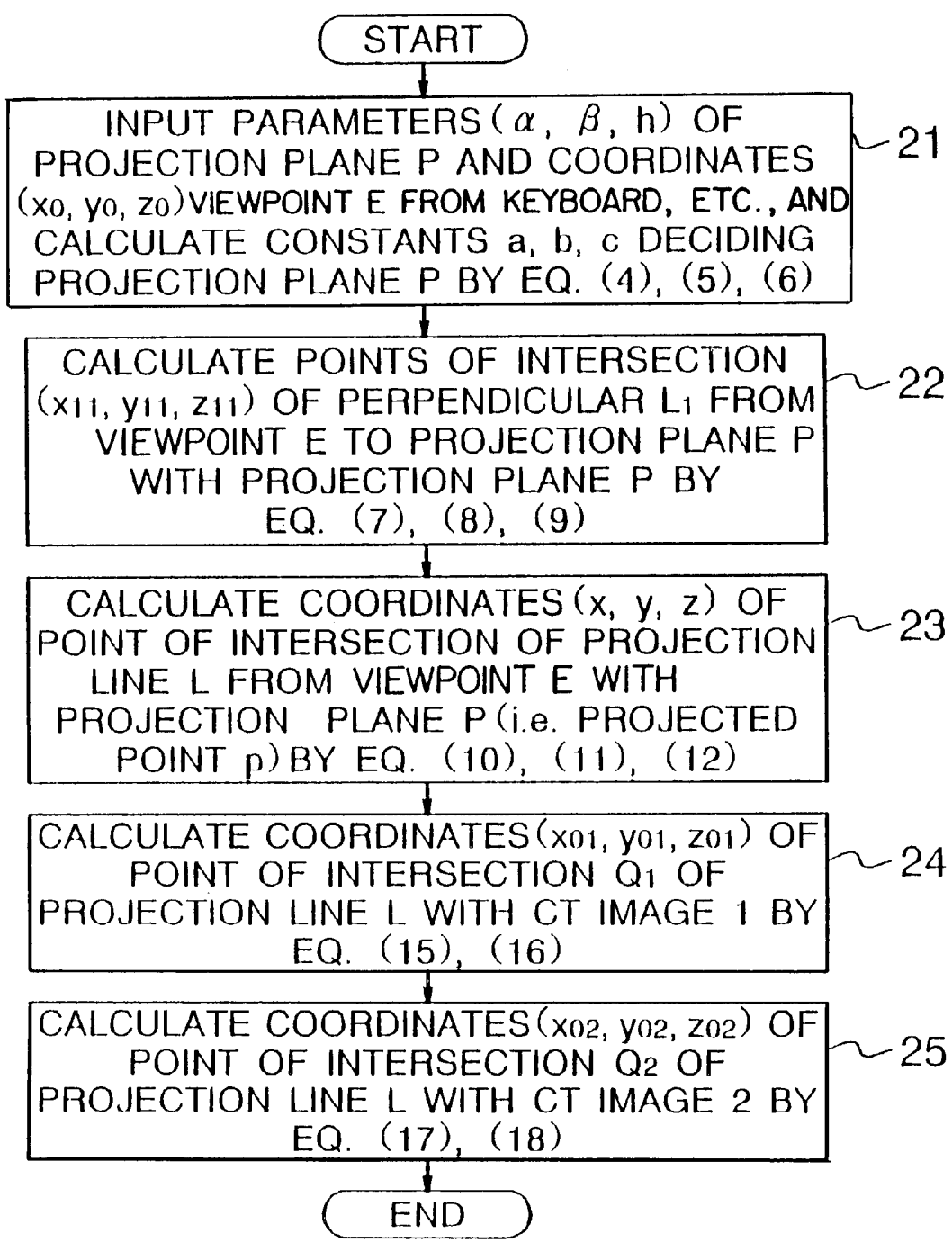
FIG. 6 is a flowchart for determining the point of intersection between the tomogram and the projection line in FIG. 5.

FIG. 6 shows the method of calculation of the points of intersection $Q_1$ and $Q_2$ of the step 13. At the step 21 in FIG. 6, the parameters $(\alpha, \beta, h)$ of the projection plane P and the coordinates $(x_0, y_0, z_0)$ of the viewpoint E are inputted from a keyboard, etc., and constants a, b and c that determine the projection plane P are calculated in accordance with equations (4), (5) and (6). These constants a, b and c represent the distances from the origin of the x, y, z coordinates system to the x, y, z axes points of intersection to the projection plane P.

$$a = \frac{t \pm h\sqrt{1 + \tan^2\beta}}{\cos\alpha} \tag{4}$$

(positive sign when $0 \langle \beta \langle \pi)$ $$b = \frac{a \cdot \cos\alpha}{\tan\beta} \tag{5}$$

$$c = \frac{a}{\tan\alpha} \tag{6}$$

Here, $t = x_0 \cdot \cos\alpha + z_0 \cdot \sin\alpha + y_0 \cdot \tan\beta$. $(\alpha, \beta, h)$ and $(x, y, z)$ are the values which are set by an operator.

At the next step 22, the point of intersection C $(x_{11}, y_{11}, z_{11})$ of the perpendicular $L_1$ from the viewpoint E to the projection plane P is calculated in accordance with equations (7), (8) and (9).

$$x_{11} = x_1 + \frac{c \cdot (z_1 - z_{11})}{a} \tag{7}$$

$$y_{11} = y_1 + \frac{c \cdot (z_1 - z_{11})}{b} \tag{8}$$

$$z_{11} = z_1 \pm \frac{h}{\sqrt{1 + \frac{c^2}{a^2} + \frac{c^2}{b^2}}} \tag{9}$$

(negative signal when $z_{01} \langle z_{11})$

At the step 23, the coordinates $P(x, y, z)$ of the point of intersection p (projected point) of the projection line L from the viewpoint E to the projection plane P are calculated in accordance with equations (10), (11) and (12):

$$x = \frac{X - z \cdot \sin\alpha}{\cos\alpha} \quad (10)$$

$$y = \frac{y_{11} - c_i \cdot (z - z_{11}) - a_i \cdot (x - x_{11})}{b_i} \quad (11)$$

$$z = \frac{X \cdot k_1 - Y \cdot k_2 - y_{11} \cdot k_3 - \frac{c_i \cdot k_3 \cdot z_{11}}{b_i} + \frac{a_i \cdot k_3 \cdot X}{b_i \cdot \cos\alpha} - \frac{a_i \cdot k_3 \cdot x_{11}}{b_i}}{1 - \frac{1 - c_i \cdot k_3}{b_i} + \frac{a_i \cdot k_3 \cdot \sin\alpha}{b_i \cdot \cos\alpha}} \quad (12)$$

with the proviso that $$k_1 = \sin\alpha \quad (13)$$
$$k_2 = \frac{\cos\alpha}{\sin\beta}$$
$$k_3 = \frac{\cos\alpha \cdot \cos\beta}{\sin\beta}$$

$$a_i = \frac{1}{a} \quad (14)$$
$$b_i = \frac{1}{b}$$
$$c_i = \frac{1}{c}$$

Here, symbols X and Y represent the coordinates of the coordinates (x, y, z) of the projected point p on the X-Y coordinates system. The coordinates (X, Y) of this projected point p are the combination value of arbitrary X and Y given as X=−256 to 256 and Y=−256 to 256 at the time of scanning.

At the steps 24 and 25, the coordinates $(x_{01}, y_{01}, z_{01})$ and $(x_{02}, y_{02}, z_{02})$ of the points of intersection $Q_1$ and $Q_2$ at which the projection line L and the CT images 1 and 2 cross, respectively, are calculated in accordance with equations (15), (16), (17) and (18):

$$x_{01} = \frac{y_{01} - y}{y_1 - y} \cdot (x_1 - x) + x \quad (15)$$

$$z_{01} = \frac{y_{01} - y}{y_1 - y} \cdot (z_1 - z) + z \quad (16)$$

$$x_{02} = \frac{y_{02} - y}{y_1 - y} \cdot (x_1 - x) + x \quad (17)$$

$$z_{02} = \frac{y_{02} - y}{y_1 - y} \cdot (z_1 - z) + z \quad (18)$$

Here, $Y_{01}$ represents the y coordinates value of the CT image 1, $y_{02}$ represents the y coordinates value of the CT image 2, and the CT images 1 and 2 lie on the plane perpendicular to the y coordinates axis. The values $y_{01}$ and $y_{02}$ are the values that are inputted and set at the time of pile-up.

When the two CT images 1 and 2 are given, there is the method which normalizes the distance $y_{01}-y_{02}$ between them to provide a normalized distance "1", divides by N the straight line connecting $Q_1$ and $Q_2$ at this normalized distance "1" and obtains the pixel value for each minimum pitch so divided by interpolation at the step 15 in FIG. 5. According to this method, interpolation may be effected for each minimum pitch, and process becomes easier.

Figure 7:
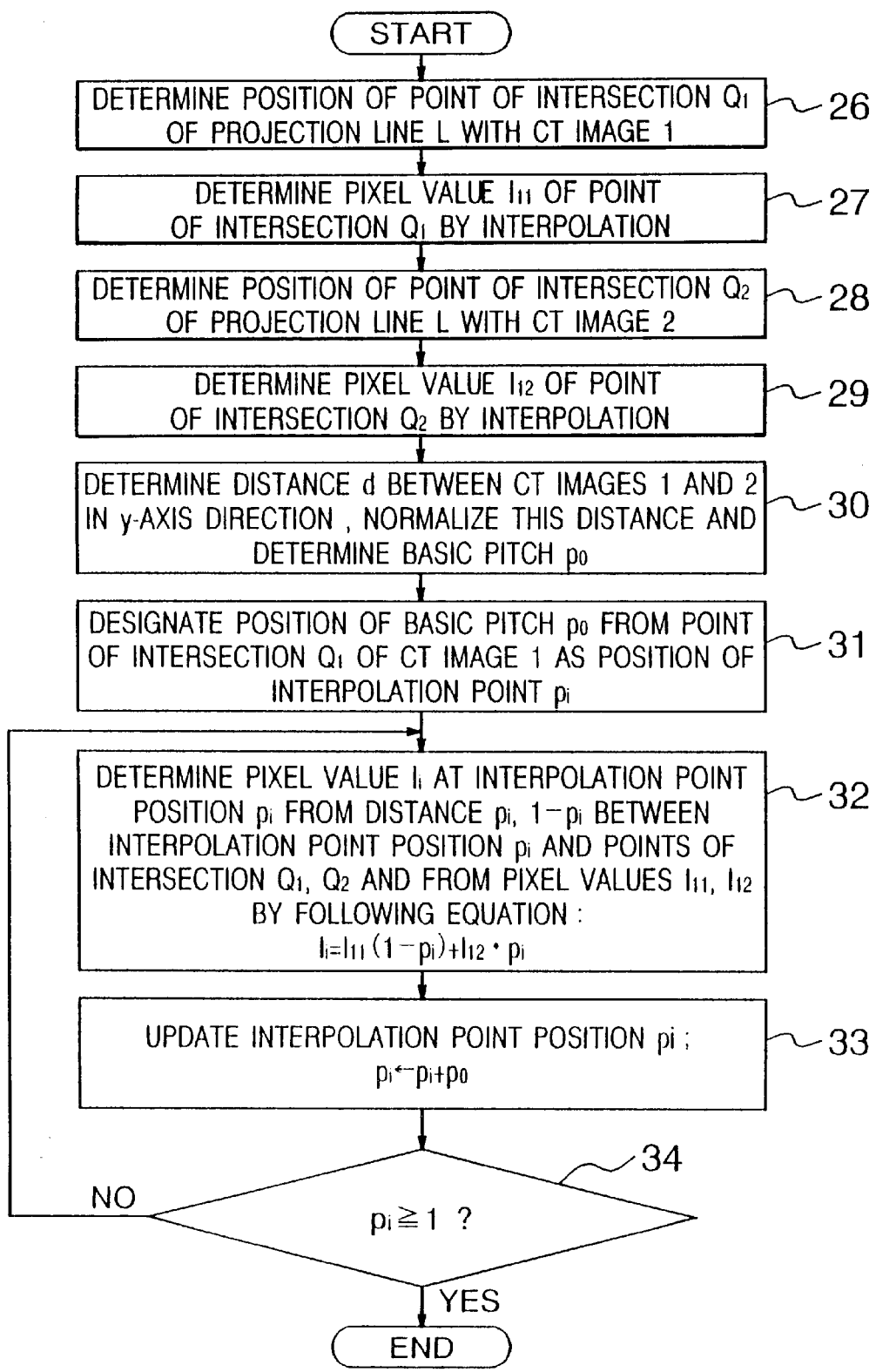
FIG. 7 is a flowchart for determining a pixel value of the interpolation point in FIG. 5.

FIG. 7 is a flowchart showing another embodiment of the present invention which executes the interpolation computation by using the normalized distance. First, the position of the point of intersection $Q_1$ between the projection line L and the CT image 1 is determined at the step 26, and the pixel value $I_{11}$ of the point of intersection $Q_1$ is obtained by interpolation at the step 27 (corresponding to the step 145 in FIG. 5). Similarly, the position of the point of intersection $Q_2$ is determined at the step 28 and its pixel value $I_{12}$ is obtained at the step 29. The distance d (=$y_{01}-y_{02}$) between the CT images 1 and 2 in the y-axis direction is read and normalized at the step 30. The basic pitch $p_0$ between the points of intersection $Q_1$ and $Q_2$ is determined at the step 31, and the position $p_i$ of the basic pitch $p_0$ is designated first from the point of intersection $Q_1$ ($p_i=p_0$ is set). The basic pitch $p_0$ is the distance in the y-axis direction. The pixel value at this basic pitch position is determined from the pixel values $I_{11}$ and $I_{12}$ of the points of intersection $Q_1$ and $Q_2$ and the basic pitch $p_0$ ($I_i=I_{11}(1-p_i)+I_{12}p_i$) at the step 32.

One basic pitch $p_0$ is added at the step 33. In other words, $p_i \leftarrow p_i+p_0$. Whether or not the distance reaches the normalized distance "1" is checked at the step 34 and if it does not, interpolation is again effected at this updating position (step 32). In this way, interpolation of the distance $p_i$ is updated by using the point of intersection $Q_1$ as the starting point for each $p_0$ unit distance and the pixel value $I_i$ is determined at each time by interpolation.

Figure 8:
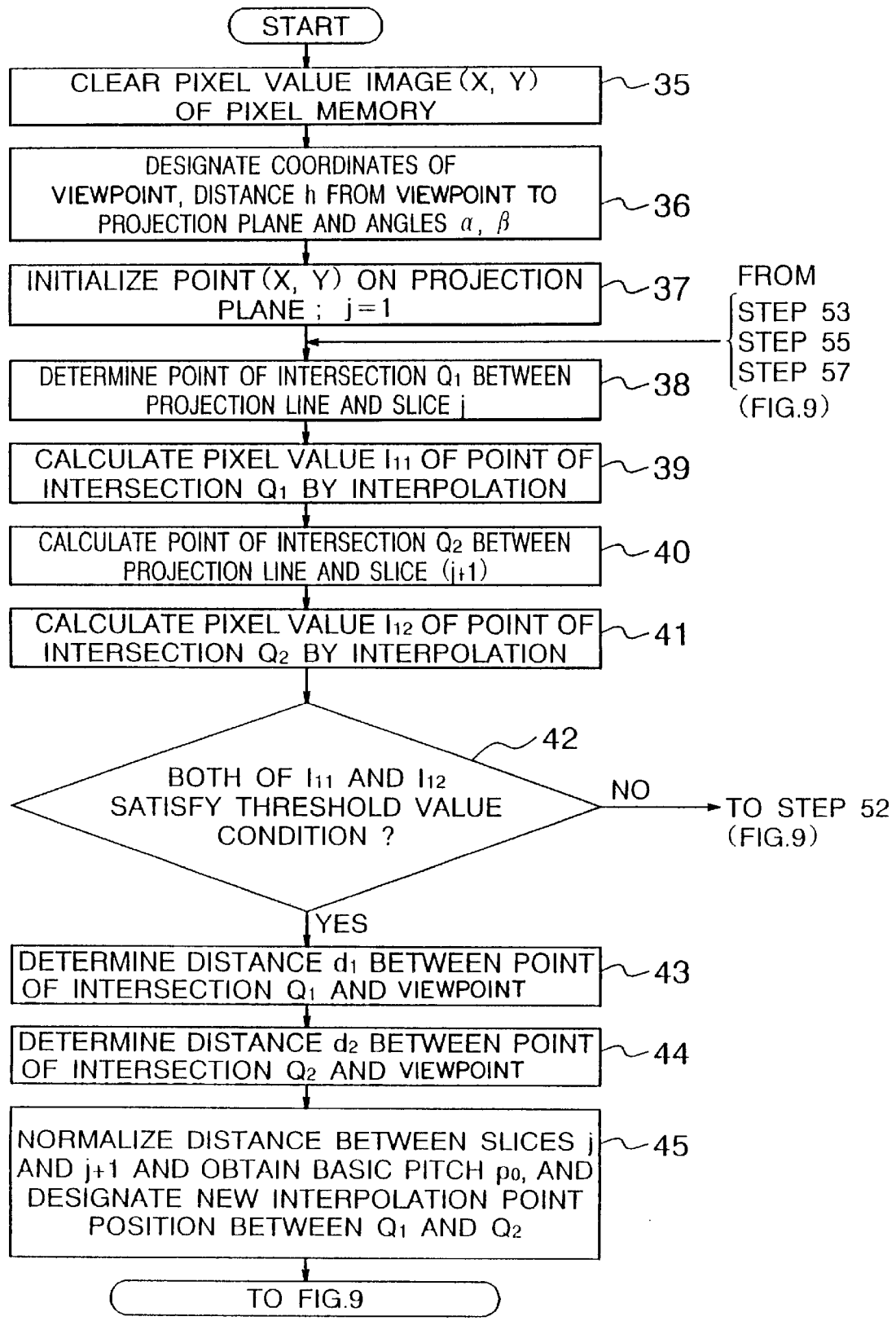
FIGS. 8 and 9 are flowcharts of other embodiments of the interpolation method according to the present invention.
Figure 9:
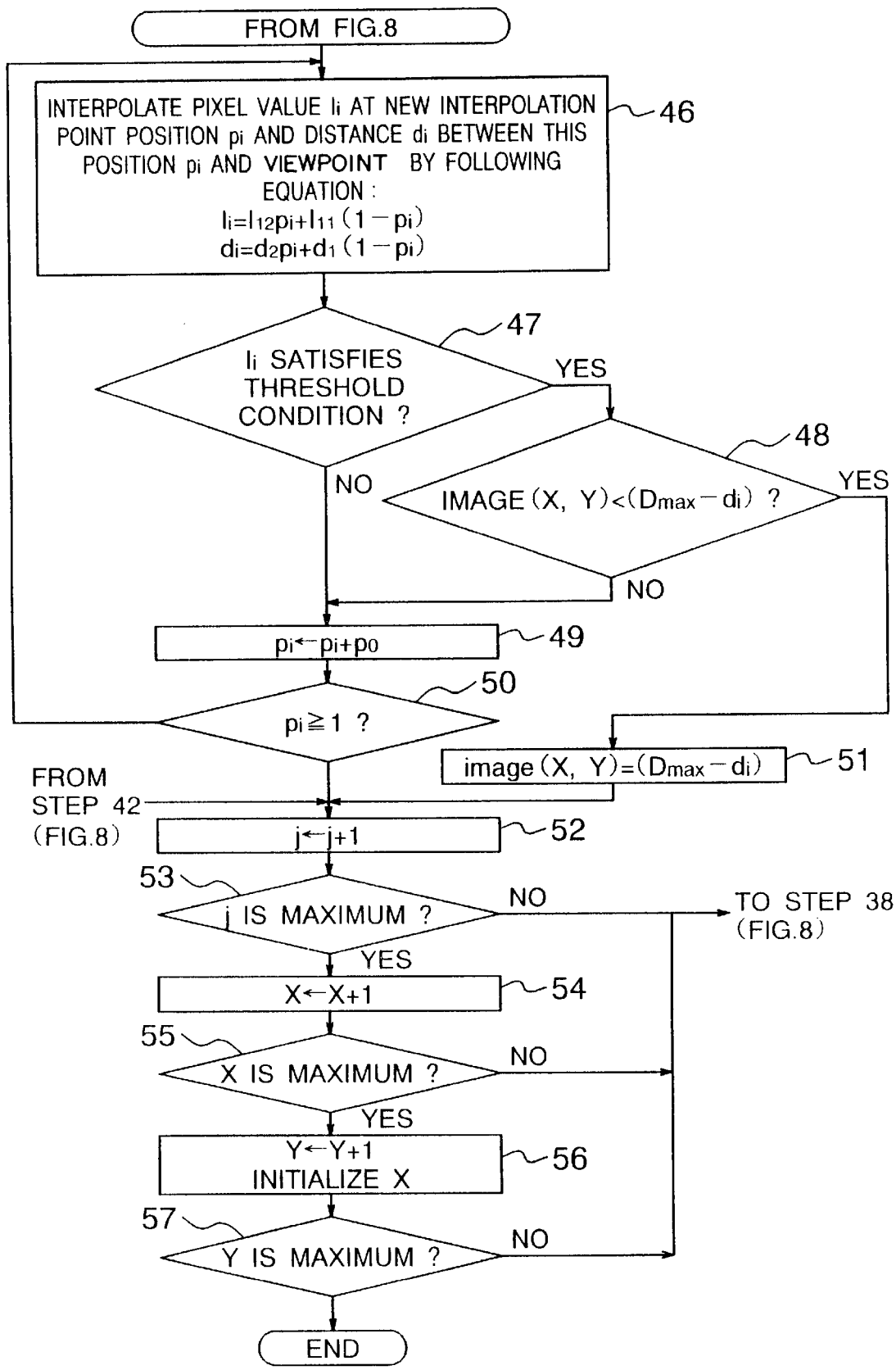

FIGS. 8 and 9 are a flowchart of an embodiment which determines the pixel value of each interpolation point by using the normalized distance and further conducts threshold process and shading process.

Referring to FIG. 8, an image memory is cleared at the step 35. The pixel value is calculated by a depth method and is expressed by image (X, Y). Here, (X, Y) represents the coordinates (projected point) of the projection plane, and the term "depth method" means a shading process. This method determines the pixel value so that, for example, remote positions become dark and near positions become light, or in other words, determines the pixel value in inverse proportion to the distance.

The position ($x_0$, $y_0$, $z_0$) of the viewpoint E and the parameters ($\alpha$, $\beta$, h) are inputted at the step 36. If the basic pitch $p_0$ can be calculated in advance, it is inputted, too. FIG. 8 shows an example where $p_0$ is calculated at the step 45. The scanning point (projected point) p(x, y) of the projection plane P is initialized at the step 37. The slice number (CT image number) j is set to j=1.

The position of the point of intersection $Q_1$ is determined at the step 38 and the pixel value $I_{11}$ of the point of intersection $Q_1$ is determined from the surrounding pixel values by interpolation at the step 39. Similarly, the position of the point of intersection $Q_2$ is obtained at the step 40 and the pixel value $I_{12}$ of this $Q_2$ is obtained from the surrounding pixel values by interpolation at the step 41.

Whether or not $I_{11}$ and $I_{12}$ satisfy the predetermined threshold value is checked at the step 42. Here, the term "threshold value" represents a reference threshold value for extracting a region of interest or an organ to be extracted, and the pixel positions and the pixel values of the region of interest or the organ to be extracted are extracted at the step 42. If they do not satisfy the threshold value, the flow proceeds to the step 52, at which the interpolation point with the next CT image is determined.

The distance $d_1$ between the point of intersection $Q_1$ and the viewpoint E is calculated at the step 43. Similarly, the distance $d_2$ between the point of intersection $Q_2$ and the viewpoint E is determined at the step 44. The distance $p_i$ from the slice number 1 (that is, the CT image 1) to the interpolation point is set to $p_i=p_0$. In this way, the first interpolation point $p_i=p_0$ advancing from the $Q_1$ point by the pitch $p_0$ is set.

The pixel value $I_i$ at this interpolation point and the distance $d_i$ from the interpolation point to the viewpoint are calculated in accordance with the following equations (19) and (20) at the step 46:

$$I_i = I_{12} \cdot p_i + I_{11} \cdot (1 - p_i) \qquad (19)$$

$$d_i = d_2 \cdot p_i + d_1 \cdot (1 - p_i) \qquad (20)$$

Whether or not $I_i$ obtained by interpolation satisfies the threshold value is checked at the step 47. This threshold value is the same as that of the step 42. If $I_i$ satisfies the threshold value, the pixel value $(D_{max}-d_i)$, which would be set in place of this $I_i$ in the depth method, is calculated at the step 48, and is then compared with the previous pixel value image(X, Y) at the step 48. Here, $D_{max}$ is an arbitrary value greater than the distance between the viewpoint and the projection plane. If image(X,Y)<$(D_{max}-d_i)$, the pixel position this time exists in the foreground and this pixel value is set to a new depth pixel value. In other words, image(X, Y) is set to image(X, Y)=$(D_{max}-d_i)$. This setting is directed to prevent two or more pixel values from being displayed in superposition with one scanning point (projected point) and to prevent the drop of display quality. When the process of this step 51 is executed, only the pixels on the foreground side are displayed.

At the step 49, $p_0$ is added to the interpolation point so obtained and the position of the interpolation point is updated. Next, whether or not the updated interpolation point $p_i$ reaches the normalized distance "1" is check ed at the step 50.

The slice number (CT image number) is updated at the step 52. In this instance, next adjacent CT images 2 and 3 are selected in place of the adjacent CT images 1 and 2.

Whether or not j exceeds the last CT image (J=maximum value) is checked at the step 53. If it exceeds the last CT image, the X coordinates value of the scanning point is updated to X+1 at the step 54. If j<maximum value, the flow proceeds to the step 38. The Y coordinates value of the scanning point is updated to Y+1 at the step 56. If X reaches the maximum value, the X value is initialized. Whether or not X and Y reach the maximum values of their scanning range is checked at the steps 55 and 57, respectively. If they reach the maximum values, scanning of all the scanning points within the scanning range is completed. If they do not, the flow returns to the step 38.

Figure 10:
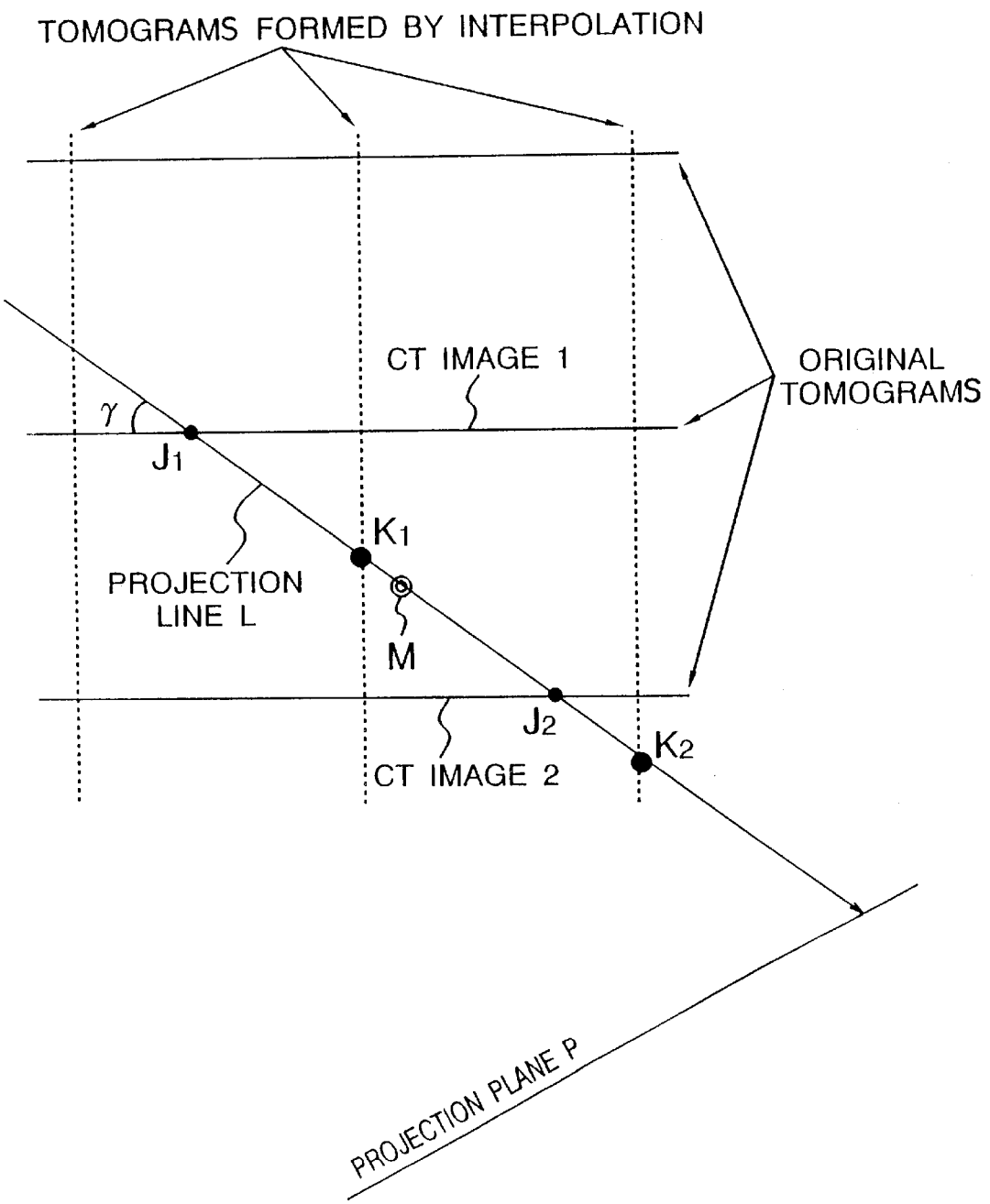
FIG. 10 is a diagram showing another embodiment of the interpolation method according to the present invention.

FIG. 10 is an explanatory view of the process when the pixel zone of the CT image is coarse. When the pixel value of the point M on the projection line is determined by the interpolation computation, calculation can be made by using the points of intersection $J_1$ and $J_2$ on the original tomogram. As the angle gamma between the original tomogram and the projection line L becomes closer to parallel (that is, as gamma becomes smaller), the gaps between $J_1$ and the M point and between $J_2$ and the M point become greater, so that interpolation accuracy drops. In such a case, interpolation may be conducted by generating in advance an interpolation image represented by dotted lines in FIG. 10 on the basis of the original tomogram (though two images are shown crossing orthogonally each other in the drawing, they need not always cross each other), and interpolating the value of the M point from the points $K_1$ and $K_2$ on the interpolated image.

The explanation given above deals with the case where two original images are assumed and the pixel values of the interpolated image between them is obtained. However, the present invention is not limited to such a case.

Though the distances $r_1$ and $r_2$ are the distances in the y-axis direction in the explanation given above, they may be the distances on the x- or z-axis direction or the distances on the projection line so long as they are the two distance components representing the ratio $r_1$:$r_2$. The gap between the CT images 1 and 2 is the interpolation point in the explanation given above and this can be expanded to the case where all the pixel values of a new tomogram is obtained. Further, when the pixel values $I_{11}$ and $I_{12}$ of the points of intersection $Q_1$ and $Q_2$ are obtained in advance and are latched to an ROM, the calculation of the pixel values $I_{11}$ and $I_{12}$ can be simplified by reading out the values so latched.

In the explanation given above, linear interpolation is used to obtain the pixel value $I_i$ of the interpolation point, but interpolation is not particularly limited thereto but may be non-linear interpolation.

Figure 11:
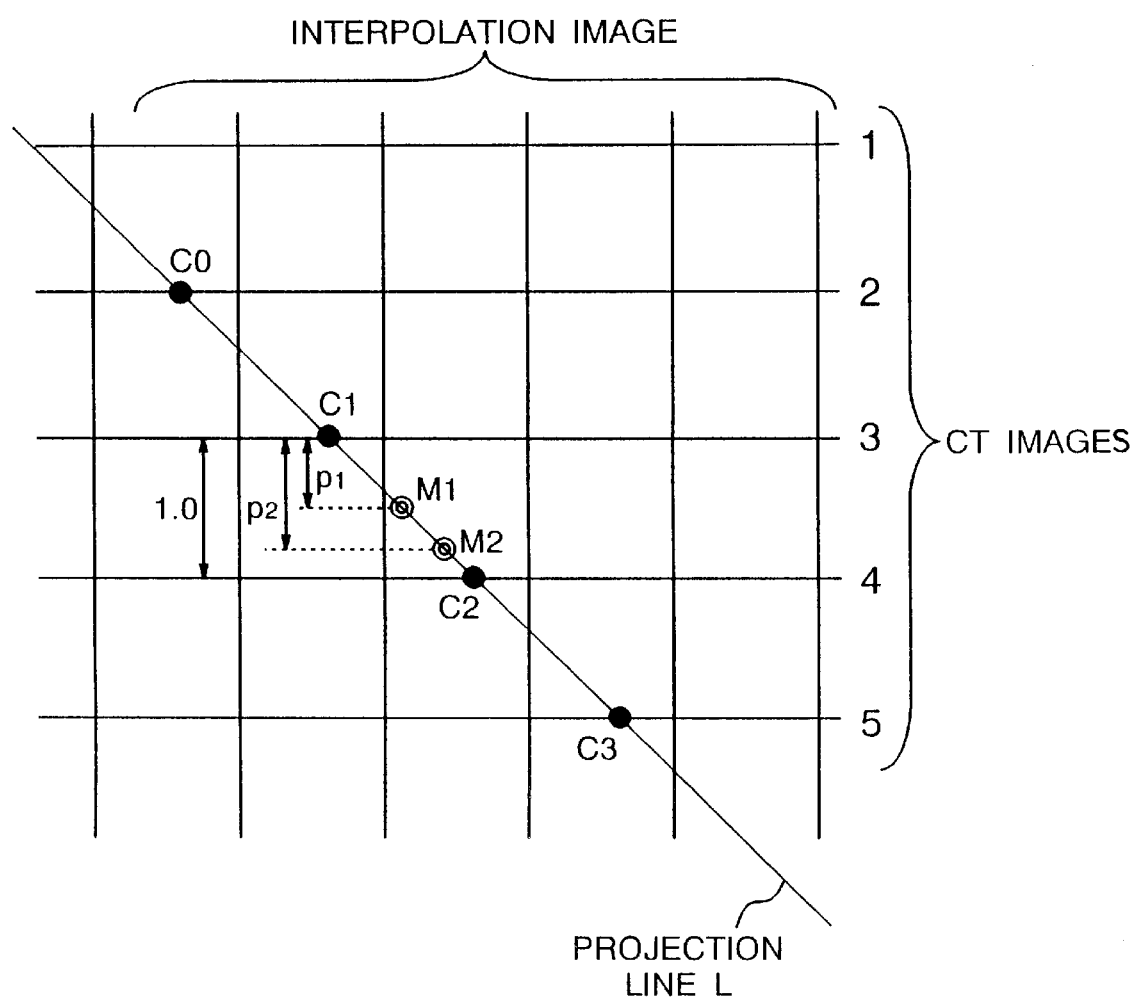
FIG. 11 is a view useful for explaining an embodiment of a tomogram non-linear interpolation method according to the present invention.

FIG. 11 is an explanatory view useful for explaining an embodiment of non-linear interpolation according to the present invention.

In FIG. 11, transverse lines represent the CT image obtained by measurement and longitudinal lines represent the interpolated image obtained by interpolation. The pixels are assumed to exist at the points of intersection between the transverse lines and the longitudinal lines. The projection line L is obliquely set to the CT image as shown in FIG. 11, and the points of intersection ($C_0$, C1, C2, C3) between the projection line L and the CT image are determined by interpolation. The distance between the points of intersection is constant. Next, the distance between the CT images 3 and 4 is normalized to 1, and the pixel value of the interpolation point M1 is determined by setting the distance between the point of intersection C1 and the interpolation point M1 to $p_1$, in accordance with the following equation (21):

$$\text{pixel value of } M_1 = \frac{p_1(1-p_1)}{4} \cdot (\text{pixel value of } C_0) + \qquad (21)$$

$$\frac{4 - 3p_1 - p_1^2}{4} \cdot (\text{pixel value of } C_1) +$$

$$\frac{p_1(5-p_1)}{4} \cdot (\text{pixel value of } C_2) + \frac{p_1(p_1-1)}{4} \cdot (\text{pixel value of } C_3)$$

Figure 2:
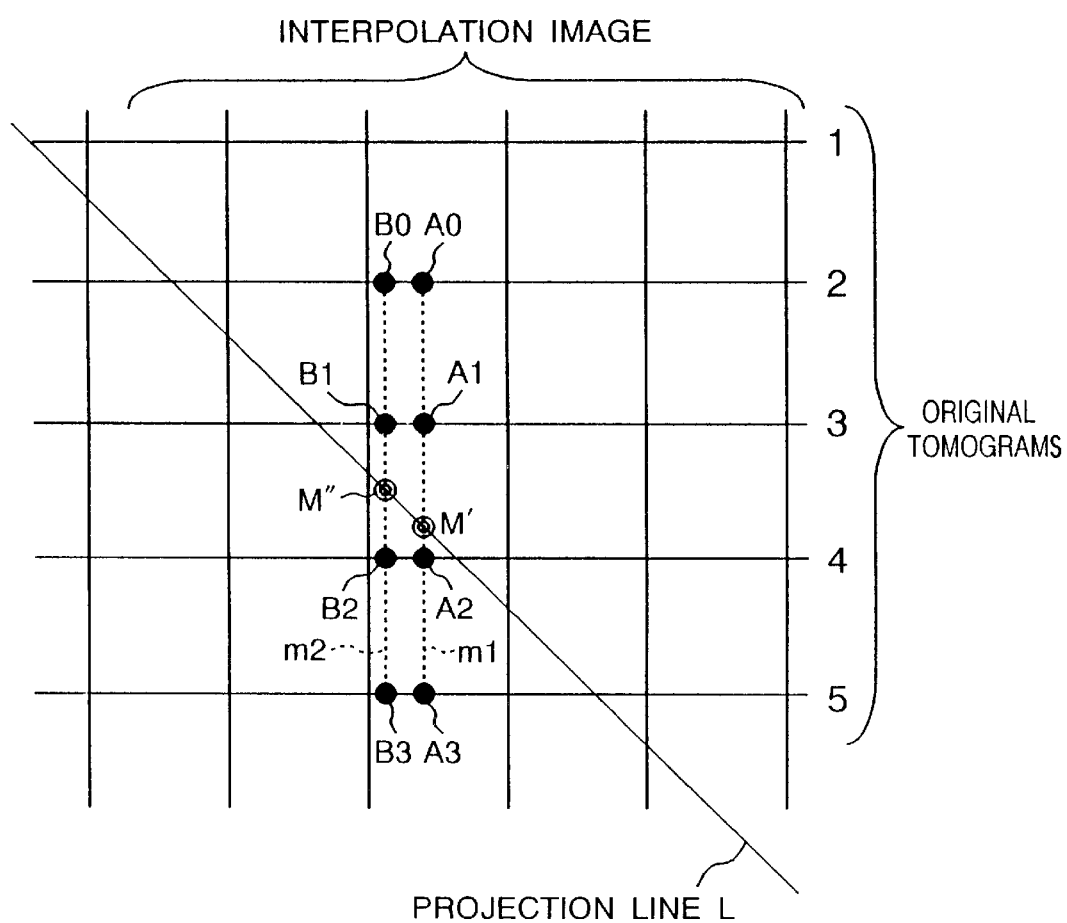
FIG. 2 is a diagram showing a tomogram non-linear interpolation method according to the prior art.

The pixel value of the interpolation point M2 can be obtained by merely substituting the distance $p_2$ for the distance $p_1$ in equation (21), and the pixel value of the points of intersection (C0, C1, C2, C3) can be used as such. Because the points used for interpolation and the pixel values of such points need not be calculated whenever the positions of the interpolation points change as has been necessary in the prior art as shown in FIG. 2, the calculation time can be drastically reduced.

Figure 12:
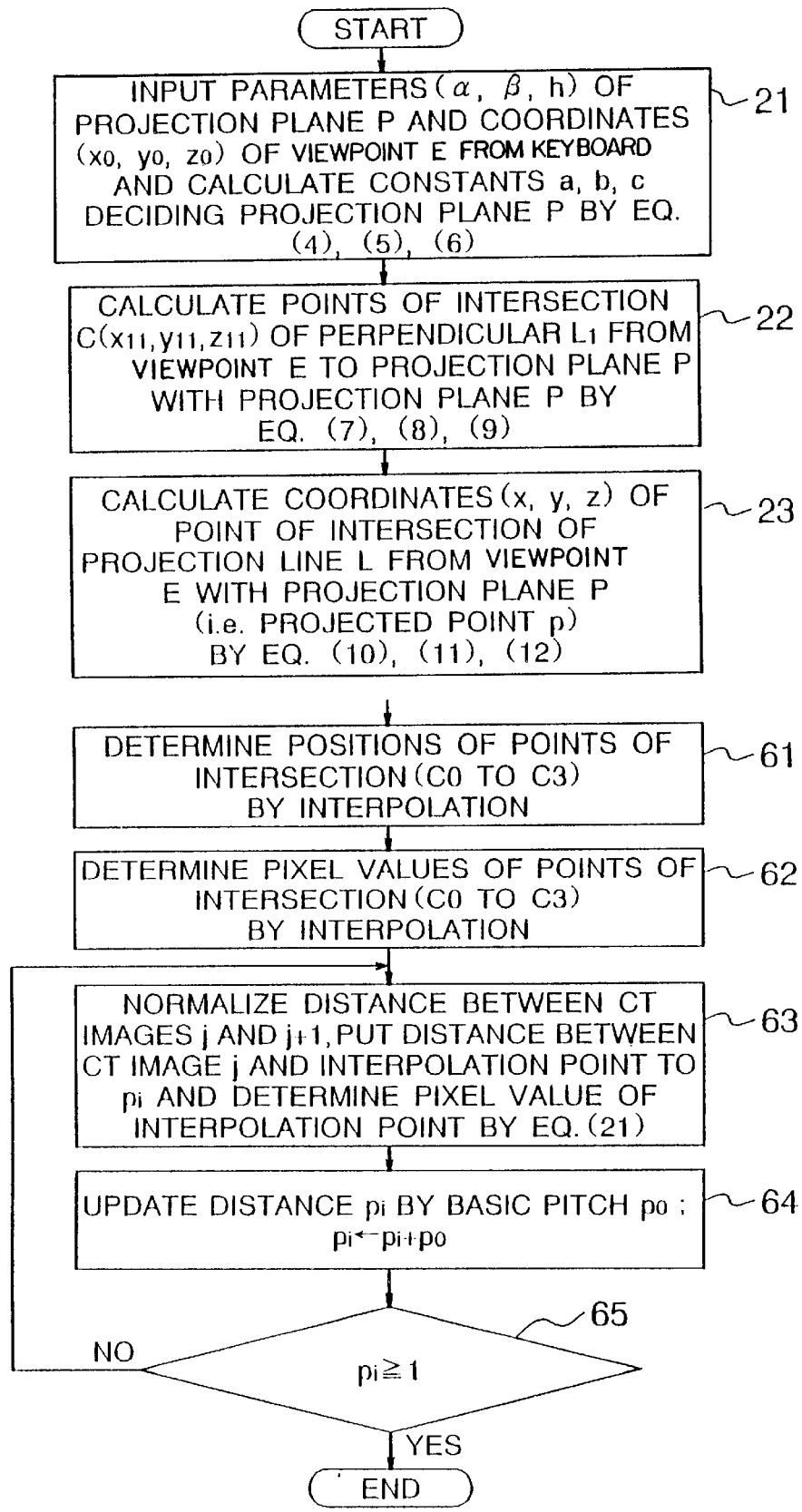
FIG. 12 is a flowchart showing an embodiment of the non-linear interpolation method shown in FIG. 11.

FIG. 12 is a flowchart of an embodiment of non-linear interpolation.

The steps 21 to 23 are the same as those shown in FIG. 6. The positions of the points of intersection (C0, C1, C2, C3) between the projection line L and the CT images j−1, j, j+1, j+2 are determined at the step 61. In the case of FIG. 11, the CT images j and j+1 correspond to the CT images 3 and 4, respectively. The pixel values of the points of intersection (C0, C1, C2, C3) are determined from the surrounding known pixel values at the step 62. The distance between the CT images j and j+1 is normalized at the step 63 and the pixel value of the distance $p_i$ between the CT image j and the interpolation point is determined in accordance with equation (21). Next, the distance $p_i$ is updated by the basic pitch p0 at the step 64. In other words, $p_i+p_0$ is set to $p_i$. Whether or not the distance $p_i$ exceeds the normalized distance 1 is checked at the step 65. If it proves NO, the flow returns to the step 63 and the pixel value of a new interpolation point is determined. If it proves YES, the process is completed by judging that the interpolation points between the CT images j and j+1 are all obtained.

When the interpolation points between the CT images j+1 and j+2 are determined, the CT image j is incremented and the steps 61 to 65 are repeated.

Figure 13:
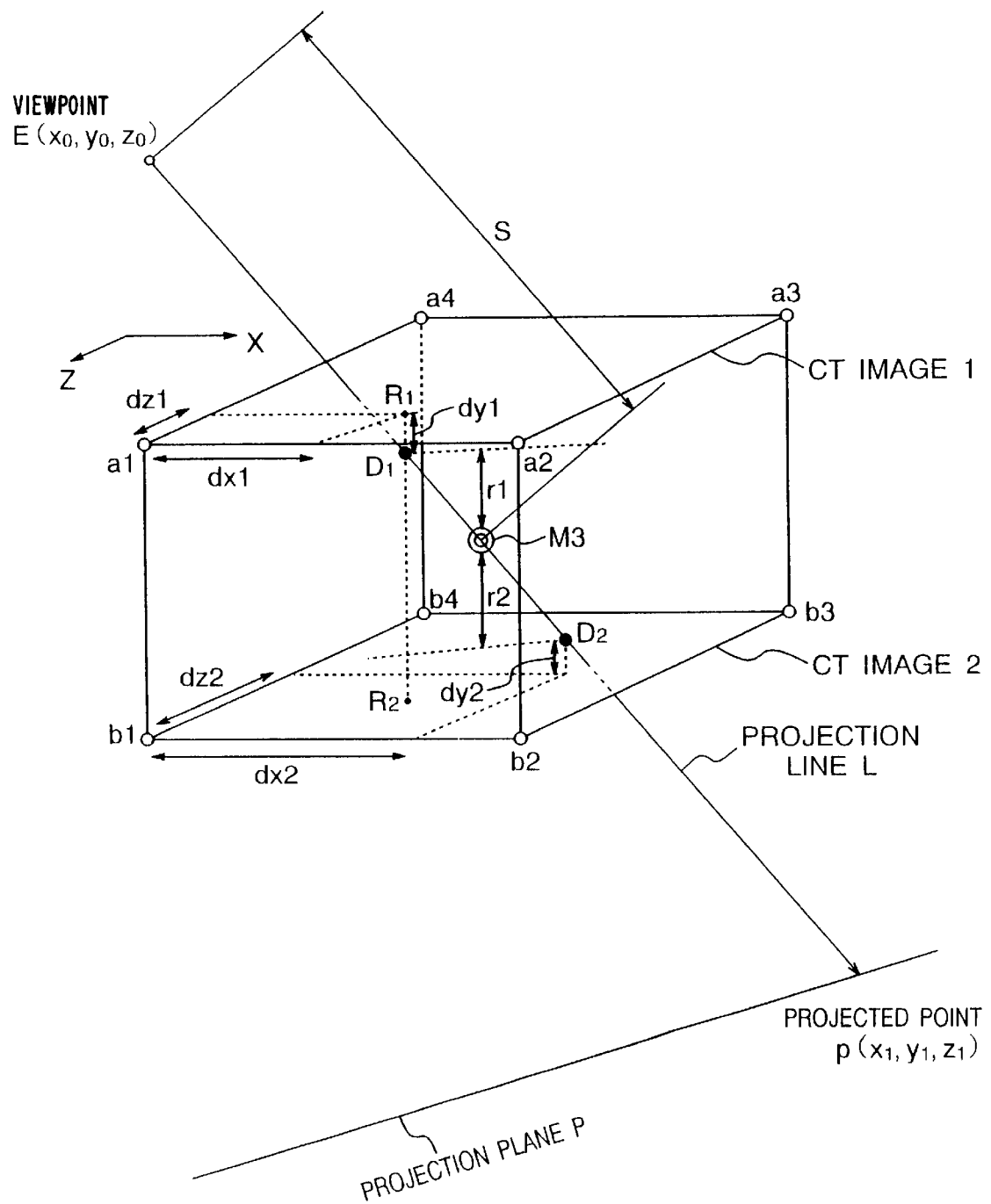
FIG. 13 is a view useful for explaining an embodiment of a tomogram linear interpolation method according to the present invention.

FIG. 13 shows another embodiment of the interpolation method according to the present invention.

The embodiment shown in FIG. 13 determines the pixel value of the interpolation point M3 between the points D1 and D2 using the pixel values of the two points D1 and D2 on the projection line L. However, the points D1 and D2 are the points which do not exist on the CT images 1 and 2. The pixel values of the pixel positions a1, a2 a3 and a4 on the CT image 1 are called Qa1, Qa2, Qa3 and Qa4 and the pixel values of the pixel positions b1, b2, b3 and b4 on the CT image 2 are called Qb1, Qb2, Qb3 and Qb4, respectively.

The pixel values QD1 and QD2 of the points D1 and D2 are determined by interpolation from the pixel values of the pixel positions a1, a2, a3, a4, b1, b2, b3 and b4 in accordance with the following procedures.

Perpendiculars are drawn down from the point D1 to the CT images 1 and 2 and the pixel values of the points of intersection R1 and R2 with the CT images are determined by interpolation by using the pixel values Qa1, Qa2, Qa3 and Qa4 and Qb1, Qb2, Qb3 and Qb4. Further, the pixel value of the point D1 is determined by interpolation by using the pixel values of the points R1 and R2. The pixel value of the point D2 is likewise obtained. Equation for calculating the pixel values Qd1 and QD2 of the pixel values of the points D1 and D2 are given below (eq. (22) and (23)):

$$QD1 = \left[\begin{array}{l}(1-dz1)\{Qa4(1-dx1)+Qa3\cdot dx1\}+\\dz1\{Qa1(1-dx1)+Qa2\cdot dx1\}\end{array}\right]\cdot(1-dy1)+ \qquad (22)$$
$$\left[\begin{array}{l}(1-dz1)\{Qb4(1-dx1)+Qb3\cdot dx1\}+\\dz1\{Qb1(1-dx1)+Qb2\cdot dx1\}\end{array}\right]\cdot dy1$$

$$QD2 = \left[\begin{array}{l}(1-dz2)\{Qa4(1-dx2)+Qa3\cdot dx2\}+\\dz2\{Qa2(1-dx2)+a2\cdot dx2\}\end{array}\right]\cdot dy2+ \qquad (23)$$
$$\left[\begin{array}{l}(1-dz2)\{Qb4(1-dx2)+Qb3\cdot dx2\}+\\dz2\{Qb1(1-dx2)+Qb2\cdot dx2\}\end{array}\right]\cdot(1-dy2)$$

where dx1: distance when the distance between a1 and a2 is normalized to 1, dy1: distance when the distance between a1 and b1 is normalized to 1, dz1: distance when the distance between a1 and a4 is normalized to 1, dx2: distance when the distance between b1 and b2 is normalized to 1, dy2: distance when the distance between a1 and b1 is normalized to 1, dz2: distance when the distance between b1 and b4 is normalized to 1.

It will be assumed that the coordinates of the viewpoint E are (x0, y0, z0), the coordinates of the projected point p on the projection plane P are (x1, y1, z1), and the distance between the viewpoint E and the projected point is l:

When the increments in the x, y and z directions are incx=(x1−x0)/l incy=(y1−y0)/l incz=(z1−z0)/l the coordinates (x, y, z) of the interpolation point M3 at the distance s on the projection line L from the viewpoint E can be expressed as follows:

x=x0+s·incx y=y0+s·incy z=z0+s·incz

The pixel value of the interpolation point M3 can be expressed as follows in accordance with equation (24) by utilizing the pixel values QD1 and QD2 of the points D1 and D2:

pixel value of interpolation point M3=r2·QD1 +r1·QD2   (24)

Here, r1 and r2 are the normalized distances between the interpolation point M3 and the points D1 and D2, respectively, when the distance between the points D1 and D2 normalized, and r1+r2=1.

In equation (24), when the threshold value for extracting the organ is given as the pixel value of M3, the coordinates satisfying this threshold value on the projection line can be immediately obtained.

Figure 14:
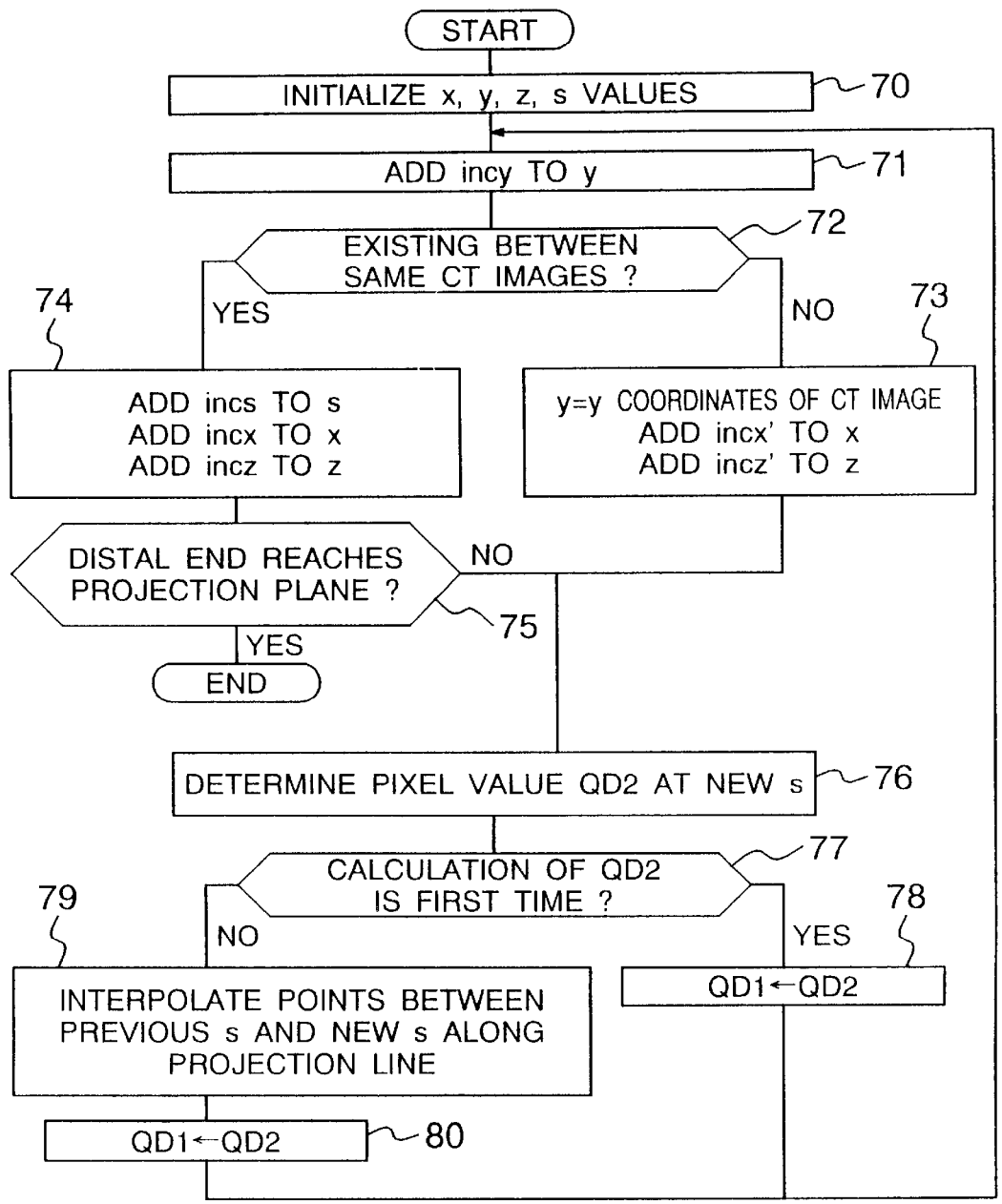
FIG. 14 is a flowchart showing an embodiment of the linear interpolation method shown in FIG. 13.

FIG. 14 is a flowchart of the embodiment shown in FIG. 13.

First, x, y and z are initialized at the step 70. In other words, they are set to x=x0, y=y0, z=z0 and s=0.

At the step 71, a point between the CT images is designated by setting y←(y+incy). In this way, the position having the distance s from the viewpoint E is designated. The point before the addition of incy is defined as "previous s" and the point after the addition, as "new s". The previous s corresponds to the point D1 in FIG. 13 and the new s does to the point D2.

Next, whether or not the previous s and the new s fall between the same CT images is judged at the step 72. More concretely, the decimal point portions of the previous s and the new s are cut off, and whether or not their integer portions are the same is judged. If they are the same, they fall between the same CT images and if not, the previous s and the new s fall between different CT images.

Figure 15:
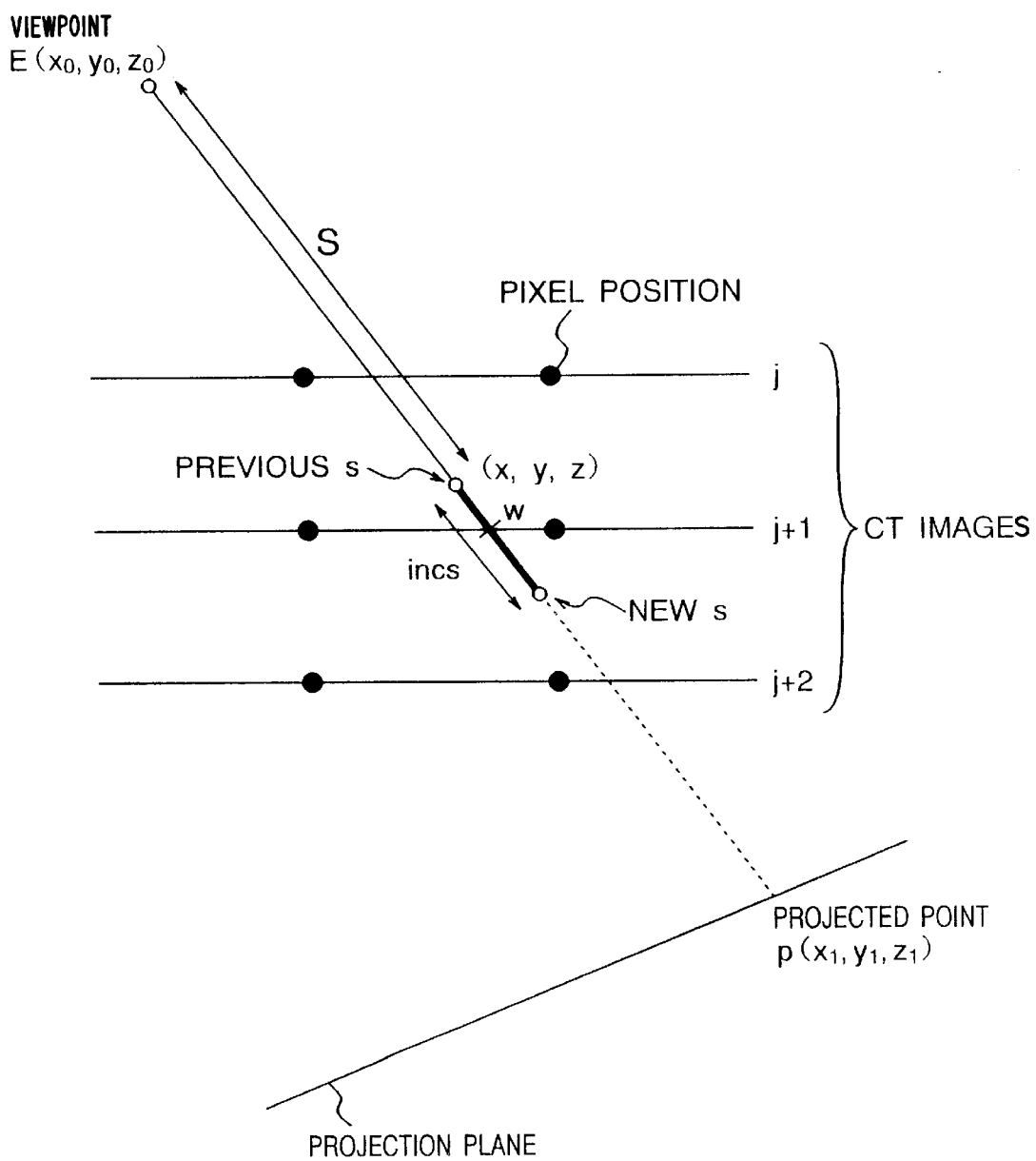
FIG. 15 is a diagram useful for explaining a method of setting points used for interpolation.

FIG. 15 shows the process when the previous s and the new s do not fall between the same CT images. In this case, the position of the new s is set to a point W on the CT image. In this way, the pixel point used for interpolation is made equal. The coordinates of the new s point in this case are set at the step 73 in the following way:

y=y coordinates of CT image
  x←(x+incx')
  z←(z+incz')

Here,
  incx'=incx·(y coordinates of CT image−y coordinates of previous s)/incy
  incz'=incz·(y coordinates of CT image−y coordinates of previous s)/incy When the previous s and the new s are judged as falling between the same CT images at the step 72, the coordinates of the new s point are set in the following way as the step 74:

s←(s+incs)
x←(x+incx)
z←(z+incz)

At the next step 75, whether or not the distal end of s reaches the projection plane is judged, and if it does not, the flow proceeds to the step 76. If it does, the process is completed.

The pixel value QD2 of the new s is obtained at the step 76.

At the next step 77, whether or not the calculation for determining the pixel value of the new s is the first time is judged. If it is the first time, QD1=QD2 is stored in the memory at the step 78. At this stage, the pixel value QD1 of the point D1 is determined, and the flow then returns to the step 71 in order to determine the position and the pixel value of the point D2.

If the calculation for determining the pixel value of the new s at the step 77 is not the first time, the pixel value QD2 obtained at the step 76 corresponds to the pixel value of the point D2. Therefore, two interpolation points are judged as having been determined, and the pixel value of the interpolation point M3 between the previous s and the new s is determined by interpolation at the step 79. The pixel value of the previous s becomes QD1. In the case of linear interpolation, the pixel value of M3 is obtained in accordance with equation (24), and the case of nonlinear interpolation will be later explained.

At the step 80, QD2 is set to QD1 and the pixel value of the new s is set to the pixel value of the previous s. The flow then jumps to the step 71 so as to determine the position of a new s and its pixel value.

Figure 16:
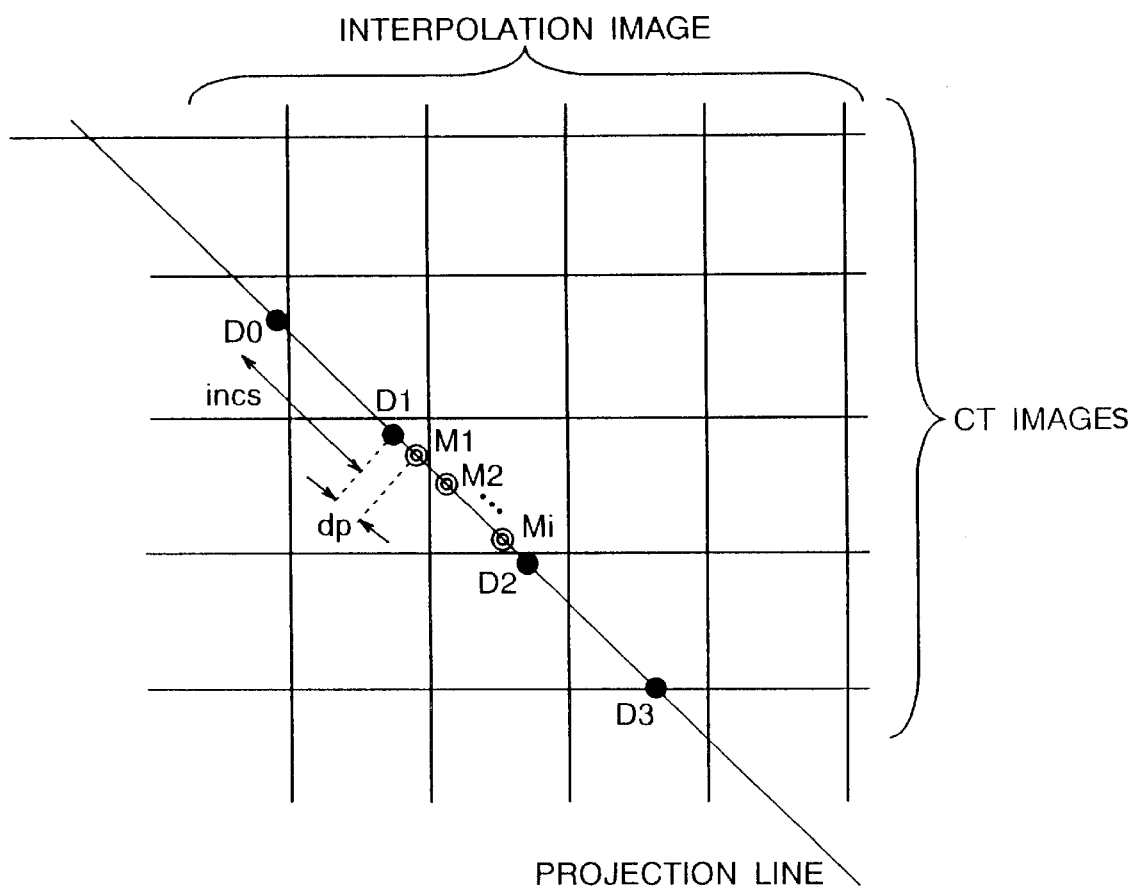
FIG. 16 is a diagram useful for explaining another embodiment of the tomogram non-linear interpolation method according to the present invention.

FIG. 16 is an explanatory view for explaining an embodiment which determines the pixel value between the interpolation points by applying the non-linear interpolation method to the embodiment shown in FIG. 14.

Figure 17:
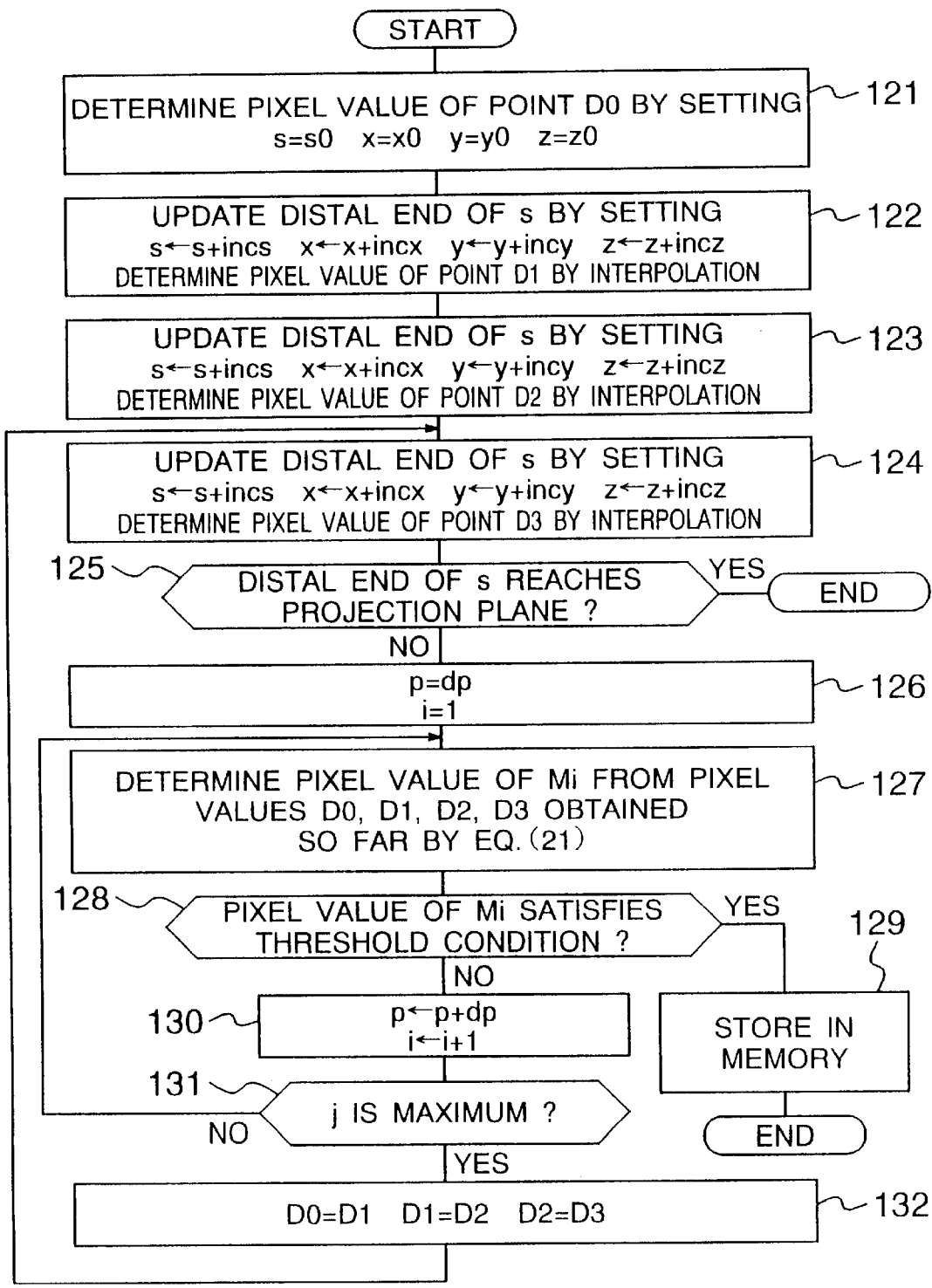
FIG. 17 is a flowchart showing an embodiment of the non-linear interpolation method shown in FIG. 16.

FIG. 17 is a flowchart of the embodiment shown in FIG. 16.

First, s, x, y and z are initialized to S=0, x=x0, y=y0 and z=z0 at the step 121 and the pixel value of the point D0 is determined by interpolation by regarding the point of the viewpoint E as the first point used for interpolation, that is, the first point d0. Equations (22) and (23), for example, can be used for this purpose.

At the next step 122, incs, incx, incy and incz are added to s, x, y and z, respectively, and the distal end of s (new s) is updated. Then, the position of the second point D1 used for interpolation, which is spaced apart by the predetermined distance incs from the point D0, and its pixel value, are determined by interpolation.

At the step 123, incs, incx, incy and incz are added to s, x, y and z, respectively, and the distal end of s (new s) is updated. The position of the third point D2 used for interpolation, which is spaced apart by the predetermined distance incs from the point D1, and its pixel value, are determined by interpolation.

At the step 124, incs, incx, incy and incz are added to s, x, y and z, respectively, and the distal end of s (new s) is updated. The position of the fourth point D3 used for interpolation, which is spaced apart by the predetermined distance incs from the point D2, and its pixel value, are determined by interpolation.

Whether or not the distal end of s reaches the projection plane is judged at the step 125. If it does, the process is completed and if not, the flow proceeds to the step 126.

At this stage, the four points D0, D1, D2 and D3 and their pixel values have been determined.

Next, the gap between the points D1 and D2, for example, is divided by N, and the explanation will be given on the case where the pixel value of each interpolation point Mi (i: integer) corresponding to each division point is determined.

The distance between the points D1 and D2 is normalized at the step 126, and the position of the interpolation point M1 is determined by setting the basic pitch, when the distance is divided by N, to dp, the distance from the point D1 to p=dp and the first interpolation point to i=1. Normalization of the distance between the points D1 and D2 may be made either in the direction along the projection line or in each of the x, y and z axes. FIG. 16 shows the case where normalization is made in the direction along the projection line.

The pixel values of the points D0, D1, D2 and D3 and the pixel value of the interpolation point M1 are determined at the step 127 in accordance with equation (21).

Whether or not the interpolation point M1 satisfies the threshold value for extracting the organ is judged at the step 128. If it does, the pixel value obtained at the step 129 is stored in the memory and the process is completed. If it does not, the flow proceeds to the step 130.

At the step 130, the basic pitch dp is added to p, i is set to i=i+1, and the next interpolation point M2 is set.

Whether or not i is maximum is judged at the step 131. If it is not, the interpolation point or points are judged as still existing and the flow jumps to the step 127 so as to determine the pixel value of the interpolation point set at the step 130.

If i reaches the maximum, all the pixel values of the interpolation points between the points D1 and D2 have been obtained. Therefore, the point D0 is discarded so as to next obtain the interpolation points between the points D2 and D3, and the points D1, D2 and D3 are registered in place of the points D0, D1 and D2, respectively. The flow then returns to the step 124 in order to determine the new point D3, and the flow from the step 124 to the step 131 is executed.

Figure 18:
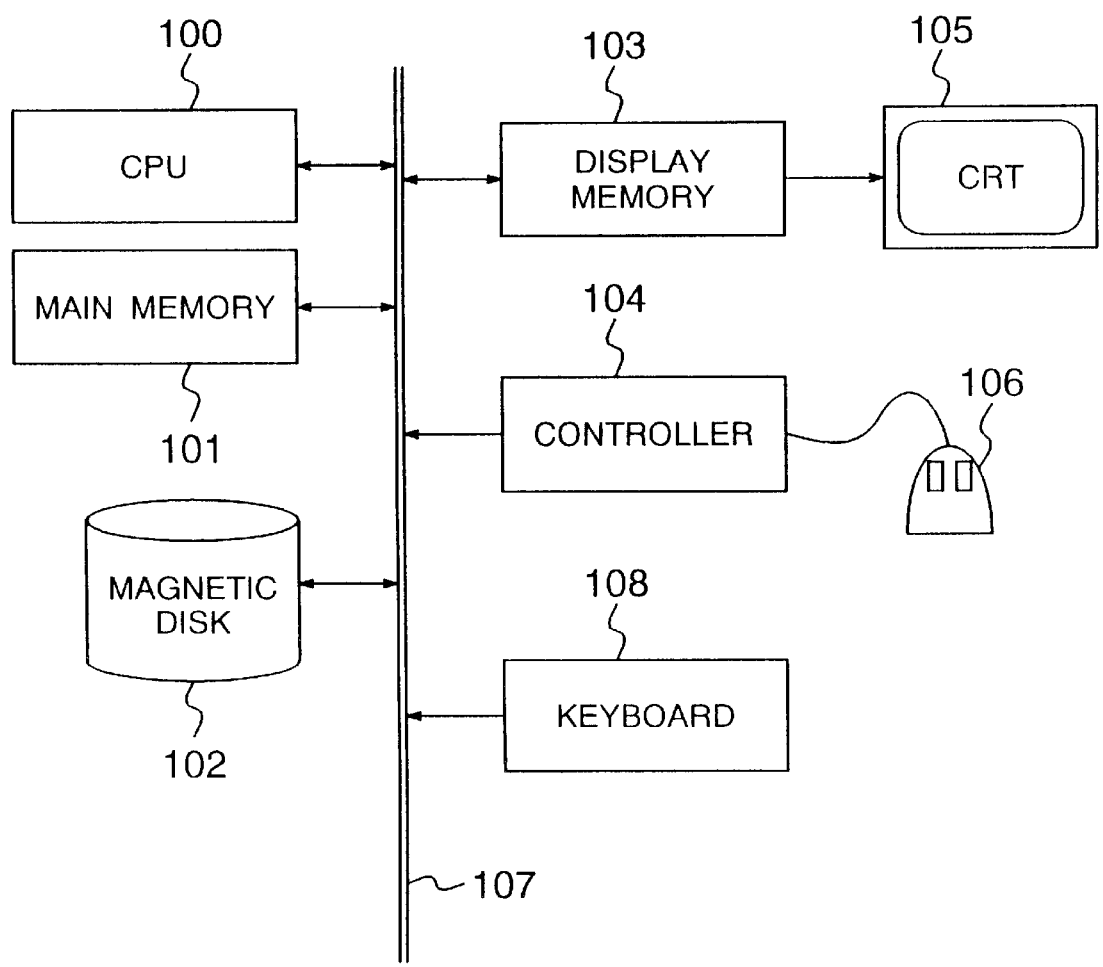
FIG. 18 is a block diagram showing an embodiment of an image processor to which the present invention is applied.

FIG. 18 is a block diagram of an embodiment of an image processor to which the present invention is applied.

In FIG. 18, a CPU 100, a main memory 101, a magnetic disk 102, a display (image) memory 103, a controller 104, a CRT 105 and a mouse (or a keyboard) 106 are shown connected to a common bus 107. The interpolation software of this embodiment is stored in the main memory 101. The CT images are stored in the magnetic disk memory 102. The mouse 106 is a device for interactively executing the interpolation processing. In this circuit construction, the interpolation software is activated by the CPU 100 and the main memory 101 and the interpolation points are computed by processing the CT images of the magnetic disk memory 102. Shading processing and plane shading processing are carried out and a three-dimensional image as a result of these processings is displayed on the CRT 105. The disk 102 is not particularly limited to the magnetic disk but various memory means such as an optical disk, an opto-magnetic disk, etc., can be used, too.

The term "interpolation" used in the foregoing embodiments represent various interpolation methods and means linear interpolation and non-linear interpolation unless otherwise stipulated specifically. Though the explanation has been given on the CT image, the present invention can be applied similarly to MRI images and ultrasonic tomograms. In other words, the present invention can be applied to all kinds of tomograms.

The present invention is not particularly limited to the foregoing embodiments but embraces various changes and modifications within the scope of the appended claims.

I claim:

1. An interpolation method of tomograms comprising the steps of:

setting the positions of a viewpoint and a projection plane in such a manner as to interpose therebetween a tomogram to be projected, inside a memory space for storing three-dimensional-data obtained by stacking a plurality of tomograms;

setting a projection line from said viewpoint to said projection plane in such a manner as not to vertically cross said tomogram;

setting positions of a plurality of first interpolation points on said projection line;

determining pixel values of said first interpolation points by interpolation;

designating two adjacent points D1 and D2 among said first interpolation points, and designating a second interpolation point between said points D1 and D2, said point D1 being closer to said viewpoint and said point D2 being closer to said projection plane; and determining a pixel value of said second interpolation point by interpolation by utilizing at least (1) the pixel values of said points D1 and D2 and (2) distances between said points D1 and D2 and said second interpolation point.

2. An interpolation method of tomograms according to claim 1, wherein said step of determining the pixel values of said first interpolation points includes a step of determining the pixel values of said first interpolation points from pixel values of two of said tomograms interposing said first interpolation points between said two tomograms by interpolation.

3. An interpolation method of tomograms according to claim 2, wherein said step of determining the pixel values of said first interpolation points by interpolation includes a step of determining pixel values of said first interpolation points from eight pixel values around said first interpolation points by interpolation.

4. An interpolation method of tomograms according to claim 1, wherein said step of setting the positions of said first interpolation points includes a step of setting positions on said tomogram.

5. An interpolation method of tomograms according to claim 1, wherein said step of setting the positions of said first interpolation points includes a step of designating said first interpolation points for each first basic pitch.

6. An interpolation method of tomograms according to claim 5, wherein when the distance is updated by said first basic pitch and when the position before updating and the position after updating exist in mutually opposite directions with respect to a first tomogram which is one of said tomograms, said step of setting the positions of said first interpolation points includes a step of designating said first interpolation points on said first tomogram.

7. An interpolation method of tomograms according to claim 1, wherein said step of designating said second interpolation point includes the steps of:

normalizing a distance between said points D1 and D2;

determining a second basic pitch by dividing the distance obtained by normalizing said distance by N (N is an integer); and designating said second interpolation point for said each second basic pitch.

8. An interpolation method of tomograms according to claim 1, further comprising the steps of:

judging whether or not a pixel value of said second interpolation point satisfies a predetermined threshold condition; and storing the pixel value of said second interpolation point as an effective pixel value into a memory when said predetermined threshold condition is satisfied.

9. An interpolation method of tomograms according to claim 8, further comprising a step of determining a distance di between said viewpoint and said second interpolation point;

wherein said step of storing the pixel value of said second interpolation point into the memory includes a step of converting the pixel value of said second interpolation point to a value which is inversely proportional to said distance di.

10. An interpolation method of tomograms according to claim 1, wherein said step of determining a pixel value of said second interpolation point includes a step of determining a pixel value of said second interpolation point by interpolation by using (1) a pixel value of another point of said first interpolation points existing closer to said viewpoint than said point D1, (2) a pixel value of another point of said first interpolation points existing closer to said projection plane than said point D2, and (3) distances between said points D1 and D2 and said second interpolation point, besides the pixel values of said points D1 and D2.

11. An interpolation method of tomograms according to claim 1, wherein said step of setting positions of said first interpolation points includes a step of roughly setting intervals between said first interpolation points.

12. An interpolation method of tomograms according to claim 1, wherein said step of setting positions of said first interpolation points includes a step of setting one first interpolation point between two of said tomograms which are adjacent to each other.

13. An interpolation method of tomograms according to claim 1, wherein said step of setting positions of said first interpolation points includes a step of closely setting intervals between said first interpolation points.

14. An interpolation method of tomograms according to claim 1, wherein said step of setting positions of said first interpolation points includes a step of setting at least two first interpolation points between two of said tomograms which are adjacent to each other.

15. An interpolation apparatus of tomograms comprising:

memory means for storing three-dimensional data obtained by stacking a plurality of tomograms;

means for setting the positions of a viewpoint and a projection plane in such a manner as to interpose therebetween tomograms to be projected and setting a projection line from said viewpoint to said projection plane in such a manner as not to vertically cross said tomograms, inside a memory space constructed on a memory by reading out said image data from said memory means;

means for setting positions of a plurality of first interpolation points on said projection line;

means for determining pixel values of said first interpolation points by interpolation;

means for designating two adjacent points D1 and D2 among said first interpolation points, and designating a second interpolation point between said points D1 and D2, said point D1 being closer to said viewpoint and said point D2 being closer to said projection plane; and means for determining a pixel value of said second interpolation point by interpolation by utilizing at least (1) the pixel values of said points D1 and D2 and (2) distances between said points D1 and D2 and said second interpolation point.

16. An interpolation apparatus of tomograms according to claim 15, wherein said means for determining the pixel values of said first interpolation points by interpolation includes means for determining pixel values of said first interpolation points from pixel values of two of said tomograms interposing said first interpolation points between said two tomograms.

17. An interpolation apparatus of tomograms according to claim 16, wherein said means for determining the pixel values of said first interpolation points by interpolation includes means for determining the pixel values of said first interpolation points from eight pixel values around said first interpolation points by interpolation.

18. An interpolation apparatus of tomograms according to claim 15, wherein said means for setting the positions of said first interpolation points includes means for setting positions on one of said tomograms.

19. An interpolation apparatus of tomograms according to claim 15, wherein said means for setting the positions of said first interpolation points includes means for designating said first interpolation points for each first basic pitch.

20. An interpolation apparatus of tomograms according to claim 19, wherein when the distance is updated by said first basic pitch and when the position before updating and the position after updating exist in mutually opposite directions with respect to a first tomogram which is one of said tomograms, said means for setting the positions of said first interpolation points includes means for designating said first interpolation points on said first tomogram.

21. An interpolation apparatus of tomograms according to claim 15, wherein said means for designating said second interpolation point includes:
means for normalizing a distance between said points D1 and D2;
means for determining a second basic pitch by dividing the distance obtained by normalizing said distance by N (N is an integer); and
means for designating said second interpolation point for each second basic pitch.

22. An interpolation apparatus of tomograms according to claim 15, further comprising:
means for judging whether or not the pixel value of said second interpolation point satisfies a predetermined threshold condition; and
means for holding the pixel value of said second interpolation point obtained as an effective pixel value when said predetermined threshold condition is satisfied.

23. An interpolation apparatus of tomograms according to claim 22, further comprising means for determining a distance di between said viewpoint and said second interpolation point;
wherein said means for holding the pixel value of said second interpolation point includes means for converting the pixel value of said second interpolation point to a value which is inversely proportional to said distance di.

24. An interpolation apparatus of tomograms according to claim 15, wherein said means for determining the pixel value of said second interpolation point by interpolation includes means for determining the pixel value of said second interpolation point by utilizing (1) a pixel value of another point of said first interpolation points existing closer to said viewpoint than said point D1, (2) a pixel value of another point of said first interpolation points existing closer to said projection plane than said point D2, and (3) distances between said points D1 and D2 and said second interpolation point, besides the pixel values of said points D1 and D2.

25. An interpolation apparatus of tomograms according to claim 15, wherein said means for setting positions of said first interpolation points includes means for roughly setting intervals between said first interpolation points.

26. An interpolation apparatus of tomograms according to claim 15, wherein said means for setting positions of said first interpolation points includes means for setting one first interpolation point between two of said tomograms which are adjacent to each other.

27. An interpolation apparatus of tomograms according to claim 15, wherein said means for setting positions of said first interpolation points includes means for closely setting intervals between said first interpolation points.

28. An interpolation apparatus of tomograms according to claim 15, wherein said means for setting positions of said first interpolation points includes means for setting at least two first interpolation points between two of said tomograms which are adjacent to each other.

29. An interpolation method of tomograms comprising the steps of:
setting positions of a viewpoint and a projection plane so that tomograms to be projected are interposed therebetween;
setting a projection line from said viewpoint to said projection plane so that said projection line does not cross said tomograms at right angles;
setting a plurality of first interpolation points on said projection line;
obtaining pixel values of said first interpolation points; and
obtaining coordinates of a second interpolation point between two of said first interpolation points which are adjacent to each other using a given pixel value for designating said second interpolation point.

30. An interpolation method of tomograms according to claim 29, wherein said step of obtaining coordinates of a second interpolation point includes a step of extracting coordinates of a point satisfying a predetermined threshold value.

31. An interpolation apparatus of tomograms comprising:
means for setting positions of a viewpoint and a projection plane so that tomograms to be projected are interposed therebetween;
means for setting a projection line from said viewpoint to said projection plane so that said projection line does not cross said tomograms at right angles;
means for setting a plurality of first interpolation points on said projection line;
means for obtaining pixel values of said first interpolation points; and
means for obtaining coordinates of a second interpolation point between two of said first interpolation points which are adjacent to each other using a given pixel value for designating said second interpolation point.

32. An interpolation apparatus of tomograms according to claim 31, wherein said means for obtaining coordinates of a second interpolation point includes means for extracting coordinates of a point satisfying a predetermined threshold value.

* * * * *